(12) United States Patent
Yahata et al.

(10) Patent No.: US 7,561,779 B2
(45) Date of Patent: Jul. 14, 2009

(54) VIDEO DATA PROCESSOR HAVING CONVERTING SECTION FOR PRODUCING NTSC- OR PAL-COMPLIANT SYNTHETIC VIDEO DATA

(75) Inventors: Hiroshi Yahata, Kadoma (JP); Tomoyuki Okada, Nara (JP); Wataru Ikeda, Osaka (JP)

(73) Assignee: Panasonic Corporation, Kadoma (JP)

( * ) Notice: Subject to any disclaimer, the term of this patent is extended or adjusted under 35 U.S.C. 154(b) by 973 days.

(21) Appl. No.: 10/519,783

(22) PCT Filed: Mar. 2, 2004

(86) PCT No.: PCT/JP2004/002583

§ 371 (c)(1),
(2), (4) Date: Dec. 29, 2004

(87) PCT Pub. No.: WO2004/082274

PCT Pub. Date: Sep. 23, 2004

(65) Prior Publication Data

US 2005/0244135 A1    Nov. 3, 2005

(30) Foreign Application Priority Data

Mar. 13, 2003    (JP) ............................. 2003-068026

(51) Int. Cl.
*H04N 5/76* (2006.01)
(52) U.S. Cl. ........................................ 386/95; 386/131
(58) Field of Classification Search .................. 386/95, 386/131, 124–126; 348/441, 443, 459
See application file for complete search history.

(56) References Cited

U.S. PATENT DOCUMENTS

| 5,438,370 | A  | * | 8/1995 | Primiano et al. ............ 348/476 |
| 6,532,041 | B1 | * | 3/2003 | Monta et al. ................ 348/468 |
| 7,042,511 | B2 | * | 5/2006 | Lin ............................ 348/445 |

FOREIGN PATENT DOCUMENTS

| JP | 2000-92458  | * | 3/2000 |
| JP | 2001-292341 |   | 10/2001 |
| JP | 2004-064166 |   | 2/2004 |

OTHER PUBLICATIONS

International Search Report for corresponding PCT/JP2004/002583, mailed Jun. 15, 2004.

* cited by examiner

*Primary Examiner*—David E Harvey
(74) *Attorney, Agent, or Firm*—Renner, Otto, Boisselle & Sklar, LLP

(57) ABSTRACT

A data processor according to the present invention includes: a receiving section to receive a data stream including data of first primary video to be presented by switching pictures at a first vertical scanning frequency and data of first auxiliary video to be presented synchronously with the first primary video; and a converting section for converting the first primary video data and the first auxiliary video data into data of synthetic video to be presented by switching the pictures at a second vertical scanning frequency, which is different from the first vertical scanning frequency. The data stream includes timing information defining respective times to present the first primary video and the first auxiliary video. The converting section associates second auxiliary video, having the same contents as the first auxiliary video on a picture of the first primary video, with a picture of second primary video, having the same contents as the counterpart of the first primary video, thereby generating synthetic video composed of the second primary video and the second auxiliary video.

10 Claims, 24 Drawing Sheets

FIG.24

PLAYER VARIABLES (SYSTEM PARAMETERS)

| # | Parameter | # | Parameter | # | Parameter |
|---|---|---|---|---|---|
| 0 | Language Code | 11 | Player audio mixing mode for Karaoke | 22 | reserved |
| 1 | Audio stream number | 12 | Country code for parental management | 23 | Player status |
| 2 | Subtitle stream number | 13 | Parental level | 24 | reserved |
| 3 | Angle number | 14 | Player configuration for Video | 25 | reserved |
| 4 | Title number | 15 | Player configuration for Audio | 26 | reserved |
| 5 | Chapter number | 16 | Language code for AST | 27 | reserved |
| 6 | Program number | 17 | Language code ext. for AST | 28 | reserved |
| 7 | Cell number | 18 | Language code for STST | 29 | reserved |
| 8 | Key name | 19 | Language coded ext. for STST | 30 | reserved |
| 9 | Navigation timer | 20 | Player region code | 31 | reserved |
| 10 | Current playback time | 21 | reserved | 32 | reserved |

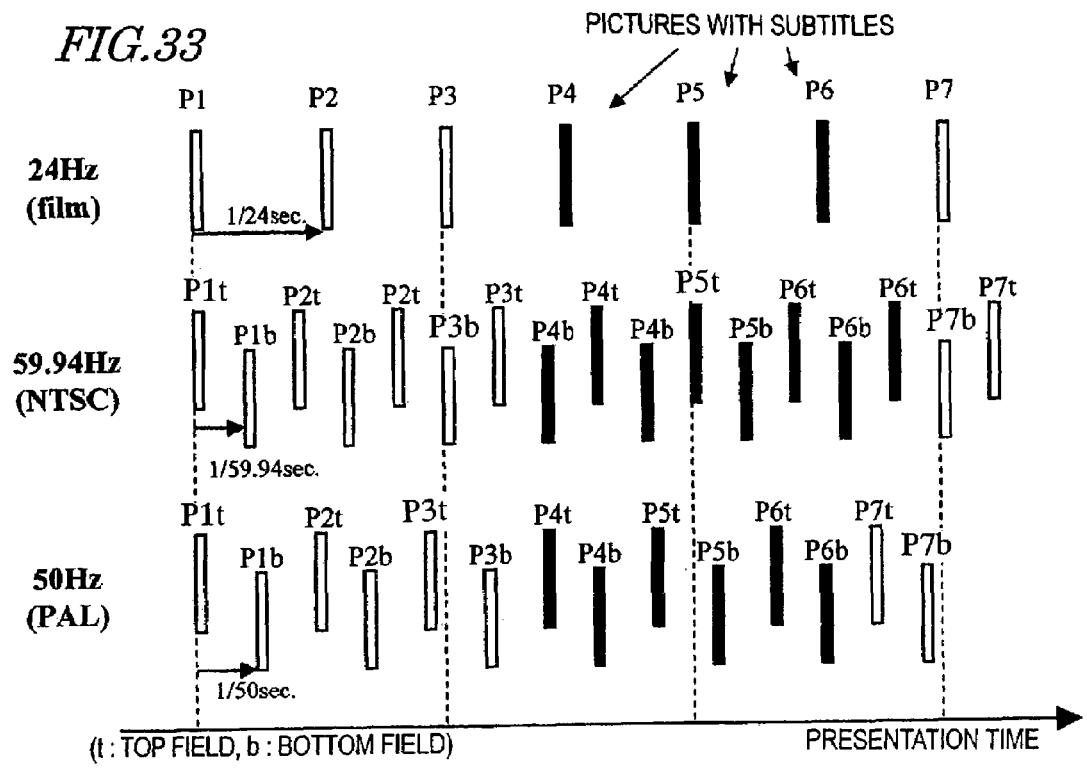
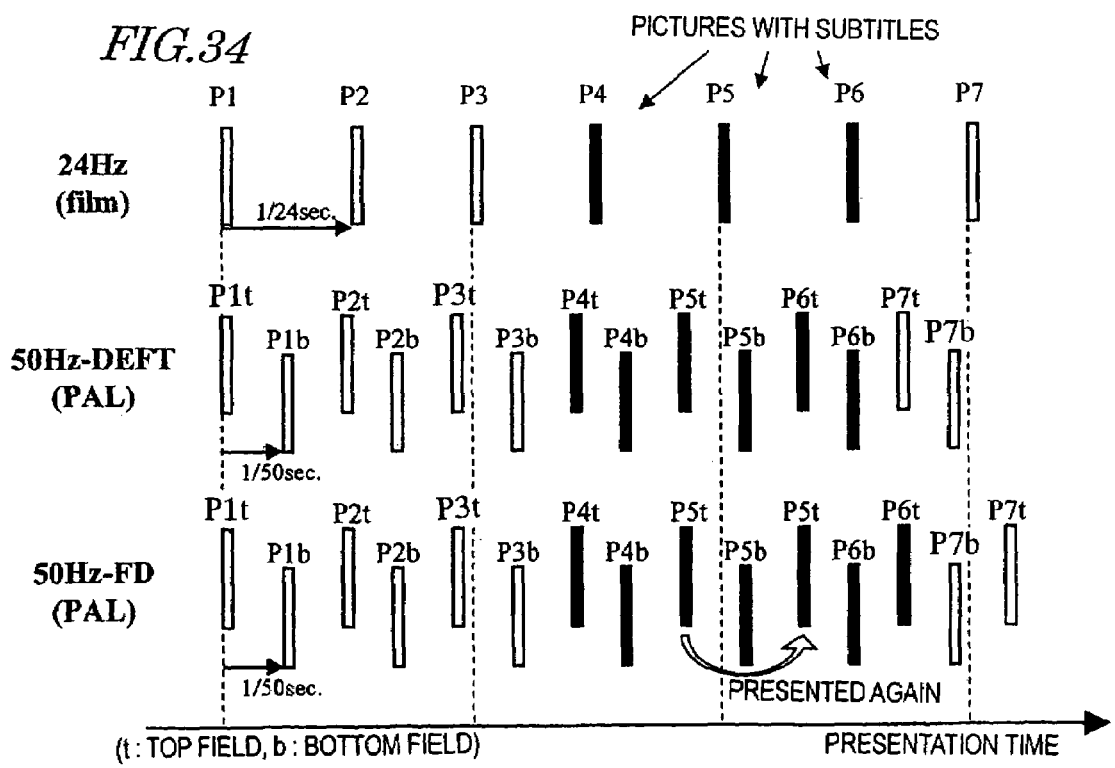

VIDEO DATA PROCESSOR HAVING CONVERTING SECTION FOR PRODUCING NTSC- OR PAL-COMPLIANT SYNTHETIC VIDEO DATA

TECHNICAL FIELD

The present invention relates to the technique of converting high definition video (HD video) into standard definition video (SD video).

BACKGROUND ART

Recently, DVDs have become very popular storage media. Among other things, a huge number of DVD-Video discs (which will be simply referred to herein as "DVDs") are already on the market as packaged software in which movies or any other type of content is stored.

FIG. 1 shows the data structure of a DVD. As shown in the lower portion of FIG. 1, logical addresses are assigned to the area between the innermost lead-in area and the outermost lead-out area of the DVD, on which logic data is written based on the logical addresses. In the data area that can be accessed based on the logical addresses (i.e., logical address space), the volume information of a file system is recorded after its header and then application data such as video or audio data is written there.

The file system refers to ISO 9660 or UDF (universal disc format) and is designed as a system that manages the data on a disc based on some unit, which is called either "directory" or "file". Even in a PC (personal computer) people use daily, the data stored on the hard disk is normally processed by a file system called "FAT" or "NTFS" so as to be represented on the computer with a data structure such as directory or file. In this manner, the usability of such data can be increased.

A DVD uses both of these file systems UDF and ISO 9660 (which are sometimes called a "UDF bridge" collectively) such that the data can be read out by a file system driver that complies with either UDF or ISO 9660. Naturally, data can be physically read from, written on, and erased from, a rewritable DVD medium such as a DVD-RAM, a DVD-R or a DVD-RW by way of such a file system.

The data stored on a DVD can be viewed as a directory or files as shown in the upper left tree of FIG. 1 by way of the UDF bridge. More specifically, a directory called "VIDEO_TS" is put just below a root directory "ROOT" so as to store the application data of the DVD. The application data is stored as a plurality of files, which includes:

VIDEO_TS.IFO: disc playback control information file;

VTS_01_0.IFO: video title set #1 playback control information file; and

VTS_01_0.VOB: video title set #1 stream file as main files.

The file system defines two types of extensions. Specifically, the extension "IFO" indicates a file on which playback control information is stored, while the extension "VOB" indicates a file on which an MPEG stream is stored as AV data. Examples of the playback control information include information needed to achieve interactivity, which allows the user to change the playback dynamically by his or her manipulation, as adopted in a DVD, information such as meta-data accompanying the title, and information accompanying the stream. Also, in a DVD, the playback control information may be generally called "navigation information".

The playback control information files include the VIDEO_TS.IFO file that manages the overall disc and the VTS_01_0.IFO file that contains playback control information for each of a plurality of video tiles in a set. It should be noted that multiple titles (e.g., different movies or different versions of the same movie) can be stored on a single DVD. In this case, "01" included in the file name body represents the number of the video title set. Thus, a video title set #2 is identified by "VTS_02_0.IFO", for example.

On the upper right corner of FIG. 1, shown is a DVD navigation space on the DVD application layer, which is a logical structure space where the playback control information is expanded. Specifically, the information included in the VIDEO_TS.IFO file is expanded as video manager information (VMGI) and the playback control information included in either the VTS_01_0.IFO file or any other video title set is expanded as video title set information (VTSI) in the DVD navigation space.

In the VTSI, program chain information (PGCI), which is information about a playback sequence called "program chain (PGC)", is described. The PGCI consists of a group of cells and a sort of programming information called "command". The cell itself is a collection of some or all of the video objects (VOBs) representing an MPEG stream. Thus, playing back a cell means playing back a section specified by the cell consisting of the VOBs.

The command is a concept comparable to Java™ script to be executed on a browser, and is processed by a DVD's virtual machine. The Java™ script can perform not only logical operations but also window and browser controls (e.g., newly opening the window of another browser). However, the DVD command can perform nothing but AV title playback controls (e.g., specifying a chapter to be played back) other than the logical operations.

Each cell includes, as its internal information, the start and end addresses of the VOBs stored on the disc (i.e., their logical addresses recorded on the disc). The player reads and writes data in accordance with the VOB start and end address information described by the cell.

FIG. 2 shows various types of information included in the navigation information embedded in a stream. The interactivity, which is one of the key features of the DVD, is not achieved just by the navigation information stored in VIDEO_TS.IFO, VTS_01_0.IFO and other files described above. In addition, some pieces of important information are multiplexed with video data and audio data in a VOB using a dedicated carrier called "navigation pack" (which will be referred to herein as either "navi pack" or "NV_PCK").

A menu will be described as a simple example of interactivity. A menu picture includes a number of buttons, for each of which a type of processing to be done when the button is selected and pressed down is defined. Also, one of those buttons is selected on the menu (i.e., highlighted with a semi-transparent color overlaid thereon to indicate the user that the button is now being selected), and the user can scroll upward, downward, rightward or leftward using the arrow keys of the remote controller to change the buttons being selected. That is to say, when the user shifts the highlight, using the arrow keys of the remote controller, to his or her desired button to be selected and pressed down and makes a decision with the enter key pressed down, a program of its associated command is executed. For example, a title or chapter associated with the button selected is played back in response to the command.

In the NV_PCK, highlight color information, individual button information and other information are included. The highlight color information describes color palette information, which specifies the semi-transparent color of the highlight to be overlaid. The button information describes rectangular area information (i.e., information about the location of each button), information about to what button the highlight should be shifted from the current button (i.e., information designating the destination buttons in response to the user's up, down, right and left key manipulations) and button command information (i.e., information about the command to be executed when the button is pressed down).

The highlight on the menu is produced as a picture to be overlaid on the menu picture. More specifically, an area corresponding to the rectangular area specified by the button information is colored in accordance with the color palette information, and then superposed on the rectangular area specified by the button information of the menu, thereby producing the highlight on the menu. This overlaid picture is synthesized with the background picture and the resultant synthetic picture is presented on the screen.

A portion of the navigation data is embedded as NV_PCK in a stream for the following purposes. Firstly, synchronization can be established more easily even if the menu information is dynamically updated synchronously with the stream (e.g., in a situation where the menu should be displayed only during 5 to 10 minutes after a movie started to be played back) or even if the given application often causes synchronization timing errors. Secondly, the machine will come in handier to the user (e.g., AV data can be decoded and played back smoothly even during a special playback operation such as a fast-find or rewind playback operation) if special playback support information is stored in the NV_PCK.

FIGS. 3A, 3B and 3C show how to generate a VOG and FIG. 3D shows a configuration for a player for playing back the VOG generated. The moving pictures, sound and subtitles shown in FIG. 3A are packetized and packed in compliance with MPEG system standard ISO/IEC 13818-1 as shown in FIG. 3B. In this case, the video is high definition video (which will be abbreviated herein as "HD video") and packetized and packed while maintaining its video quality. Examples of HD videos include various types of high-definition quality videos such as motion pictures, still pictures, characters and graphics. These types of data are multiplexed together, thereby generating a single MPEG program stream as shown in FIG. 3C. In this case, NV_PCK including button commands to realize the interactivity is also included in the mix.

When an MPEG data stream is broken down into the individual types, the data representing the motion pictures, sound or subtitles are sequentially arranged as a bit stream in the order of decoding. However, when the motion pictures, sound and subtitles are multiplexed together by an MPEG system, not all of the data included in the bit stream are arranged in the order of playback (i.e., in the order of decoding) among the respective types. For example, even if a motion picture data pack and a subtitle data pack are arranged back to back, that motion picture data and that subtitle data pack are not always decoded or played back at the same timing.

These data should be multiplexed in this manner because there is a restriction that an MPEG stream needs to be encoded so as to be decoded by a predetermined decoder model (which is a so-called "system target decoder (STD)"). That is to say, a number of decoder buffers associated with respective elementary streams are defined for a decoder model. One of those buffers associated with an elementary stream has a different capacity from that of another one of the buffers associated with another elementary stream. More specifically, a buffer associated with a stream of motion pictures has a capacity of 232 KB, a buffer associated with a stream of sound has a capacity of 4-KB and a buffer associated with a stream of subtitles has a capacity of 52 KB. Also, the video and audio data are temporarily stored until it is time to decode them. The timing of decoding changes with the specific buffer capacity. Accordingly, even if two data are multiplexed together back to back, those data may still be decoded at different times.

An MPEG program stream to be played back is input to the player shown in FIG. 3D. A demultiplexer 3100 receives the MPEG program stream, separates a pack including motion picture data, subtitle data and audio data, and supplies it to a buffer/decoder 3108. The buffer/decoder 3108 buffers the packed data and decodes the motion picture data, subtitle data and audio data separately, thereby generating respective streams. More specifically, the buffer 3108 includes a video buffer, a subtitle buffer and an audio buffer and stores the motion picture data, subtitle data and audio data in the video, subtitle and audio buffers, respectively. Thereafter, the buffer/decoder 3108 makes motion picture data, subtitle data and audio data based on the packed data and outputs them. No decoders are particularly shown in FIG. 3D. The buffer/decoder 3108 outputs the motion picture data, subtitle data and audio data of HD video. After having been decoded, the audio data is output to a loudspeaker, for example, and reproduced as sound.

The HD video data is processed as follows. The HD video data (including motion picture data, still picture data and character/graphics data) is output from the buffer/decoder 3108 to respective processing paths. Specifically, the motion picture data is converted by a video converting section 3101 into NTSC- or PAL-compliant interlaced video (i.e., SD video) and then has its resolution and aspect ratio modified by a scaling section 3102. If the motion picture has been MPEG encoded, then noise unique to the MPEG compression (such as block noise and mosquito noise) is removed effectively by a first image quality correcting section 3103. As a result, the image quality is improved. On the other hand, the still picture data is subjected to image quality correction unique to a still picture encoding method and down-converted by a second image quality correcting section 3104. And the still and motion pictures are output alternately. The character/graphics data is subjected to a down conversion suitable for characters and graphics by a third image quality correcting section 3105.

On the other hand, the subtitle data is output to a fourth image quality correcting section 3107. Specifically, the subtitle data is subjected to necessary color conversion processing by way of a color conversion table CLUT 3106 and then down-converted into SD video by the fourth image quality correcting section 3107. Thereafter, the SD video subtitle data and the SD video motion picture data are synthesized together, and the resultant synthetic video is output to a TV that can present SD video.

After the video data has been output from the buffer/decoder 3108, the resolution, aspect ratio, frame rate and other parameters are converted from HD video grades into SD video grades. This is because if the motion picture, still picture and subtitles can be processed individually through their best filters, then the deterioration in image quality can be minimized during the down conversion. Processing of this type is disclosed in Japanese Laid-Open Publication No. 2001-292341, for example.

It is expected that there will be more and more occasions where HD video will be recorded without decreasing its frame rate. For example, as the capacities of storage media and write rates go on increasing, film materials would be recorded at the originally intended 24 frames per second and 720 P (or 1080i) more and more often. Meanwhile, it is also imaginable that TVs that can display nothing but SD video will be continuously used for a rather long time. Accordingly, there will be very high demand for a player that is intended to play HD video storage medium but can also convert HD video into SD video. However, the HD video cannot be written on any DVD on the market without decreasing its frame rate. For that reason, no DVD players have ever been designed so as to perform such a conversion as well.

Also, if multiple separate streams, including motion picture data, subtitle data and other data, respectively, are multiplexed together as in an MPEG stream, then the motion pictures, subtitles and so on need to be played back just as intended by the content provider during the authoring process when HD video is converted into SD video.

An object of the present invention is to convert the HD grade video, subtitle and other data into SD grade video, subtitle and other data while maintaining the originally intended playback timings.

DISCLOSURE OF INVENTION

A data processor according to the present invention includes: a receiving section that receives a data stream including data representing first primary video to be presented by switching a plurality of pictures one after another at a first vertical scanning frequency and data representing first auxiliary video to be presented synchronously with the first primary video; and a converting section for converting the data representing the first primary video and the first auxiliary video into data representing synthetic video to be presented by switching the pictures at a second vertical scanning frequency, which is different from the first vertical scanning frequency. The data stream includes timing information defining respective times to present the first primary video and the first auxiliary video. The converting section associates second auxiliary video, having the same contents as the first auxiliary video on a picture of the first primary video, with a picture of second primary video, having the same contents as the counterpart of the first primary video, thereby generating synthetic video composed of the second primary video and the second auxiliary video.

The converting section may include: a video converting section for converting the data representing the first primary video into data representing the second primary video by changing the vertical scanning frequencies; a subtitle converting section for converting the data representing the first auxiliary video into data representing the second auxiliary video, identifying a picture of the first primary video to be presented synchronously with letters of the first auxiliary video, and associating letters of the second auxiliary video, corresponding to the letters of the first auxiliary video, with a picture of the second primary video corresponding to the identified picture of the first primary video; and a synthesizing section for generating data representing the synthetic video by synthesizing together the second primary video data and the second auxiliary video data that have been associated with each other.

Alternatively, the converting section may include: a synthesizing section for generating superposed video, in which the first primary video and the first auxiliary video are synchronized with each other in accordance with the timing information and superposed one upon the other; and a video converting section for converting data representing the superposed video into data representing the synthetic video.

As another alternative, the converting section may convert the data representing the first primary video and the first auxiliary video and having a predetermined resolution into data representing the synthetic video that has a resolution different from the predetermined resolution.

In that case, the converting section may convert the first primary video data and the first auxiliary video data of a film material into NTSC- or PAL-compliant synthetic video data.

More specifically, the converting section may convert one frame of the first primary video and the first auxiliary video of the film material into at least two fields of the PAL-compliant synthetic video with the same field inserted at regular intervals a number of times during the conversion into the fields.

The data stream may include conversion permissibility information indicating whether or not the converting section may do conversion, and the converting section may do the conversion when the conversion permissibility information permits it.

The data stream may include conversion designating information designating the type of conversion to do, and the converting section may do the type of conversion that has been designated by the conversion designating information.

The data process may further include an input section, to which conversion designating information, designating the type of conversion to do, is input, and the converting section may do the type of conversion that has been designated by the conversion designating information.

In that case, the converting section may generate PAL-compliant synthetic video by performing either a conversion of presenting each picture a single time or a conversion of presenting a particular picture a number of times in accordance with the conversion designating information.

A data processing method according to the present invention includes the steps of: receiving a data stream that includes data representing first primary video to be presented by switching a plurality of pictures one after another at a first vertical scanning frequency and data representing first auxiliary video to be presented synchronously with the first primary video; and converting the data representing the first primary video and the first auxiliary video into data representing synthetic video to be presented by switching the pictures at a second vertical scanning frequency, which is different from the first vertical scanning frequency. The data stream includes timing information defining respective times to present the first primary video and the first auxiliary video. The converting step includes the step of associating second auxiliary video, having the same contents as the first auxiliary video on a picture of the first primary video, with a picture of second primary video, having the same contents as the counterpart of the first primary video, thereby generating synthetic video composed of the second primary video and the second auxiliary video.

The converting step may include: a video converting step for converting the data representing the first primary video into data representing the second primary video by changing the vertical scanning frequencies; a subtitle converting step for converting the data representing the first auxiliary video into data representing the second auxiliary video, identifying a picture of the first primary video to be presented synchronously with letters of the first auxiliary video, and associating letters of the second auxiliary video, corresponding to the letters of the first auxiliary video, with a picture of the second primary video corresponding to the identified picture of the first primary video; and a synthesizing step for generating data representing the synthetic video by synthesizing together the second primary video data and the second auxiliary video data that have been associated with each other.

Alternatively, the converting step may include: a synthesizing step for generating superposed video, in which the first primary video and the first auxiliary video are synchronized with each other in accordance with the timing information and superposed one upon the other; and a video converting step for converting data representing the superposed video into data representing the synthetic video.

As another alternative, the converting step may include the step of converting the data representing the first primary video and the first auxiliary video and having a predetermined resolution into data representing the synthetic video that has a resolution different from the predetermined resolution.

In that case, the converting step may include the step of converting the first primary video data and the first auxiliary video data of a film material into NTSC- or PAL-compliant synthetic video data.

More specifically, the converting step may include the step of converting one frame of the first primary video and the first auxiliary video of the film material into at least two fields of the PAL-compliant synthetic video with the same field inserted at regular intervals a number of times during the conversion into the fields.

The data stream may include conversion permissibility information indicating whether or not the converting section may do conversion, and the converting step may include the step of doing the conversion when the conversion permissibility information permits it.

The data stream may include conversion designating information designating the type of conversion to do, and the converting step may include the step of doing the type of conversion that has been designated by the conversion designating information.

The data processing method may further include the step of inputting conversion designating information designating the type of conversion to do, and the converting step may include the step of doing the type of conversion that has been designated by the conversion designating information.

In that case, the converting step may include the step of generating PAL-compliant synthetic video by performing either a conversion of presenting each picture a single time or a conversion of presenting a particular picture a number of times in accordance with the conversion designating information.

BRIEF DESCRIPTION OF DRAWINGS

FIG. 24 is a list of the system parameters SPRM.

FIG. 33 shows correlations between pictures of respective grades when pictures of HD video (i.e., film material video) are converted into pictures of SD video (i.e., video complying with the NTSC or PAL standard).

FIG. 34 shows correlations between the pictures in a situation where pictures of HD video (i.e., film material video) are converted into pictures of SD video.

BEST MODE FOR CARRYING OUT THE INVENTION

Figure 1:
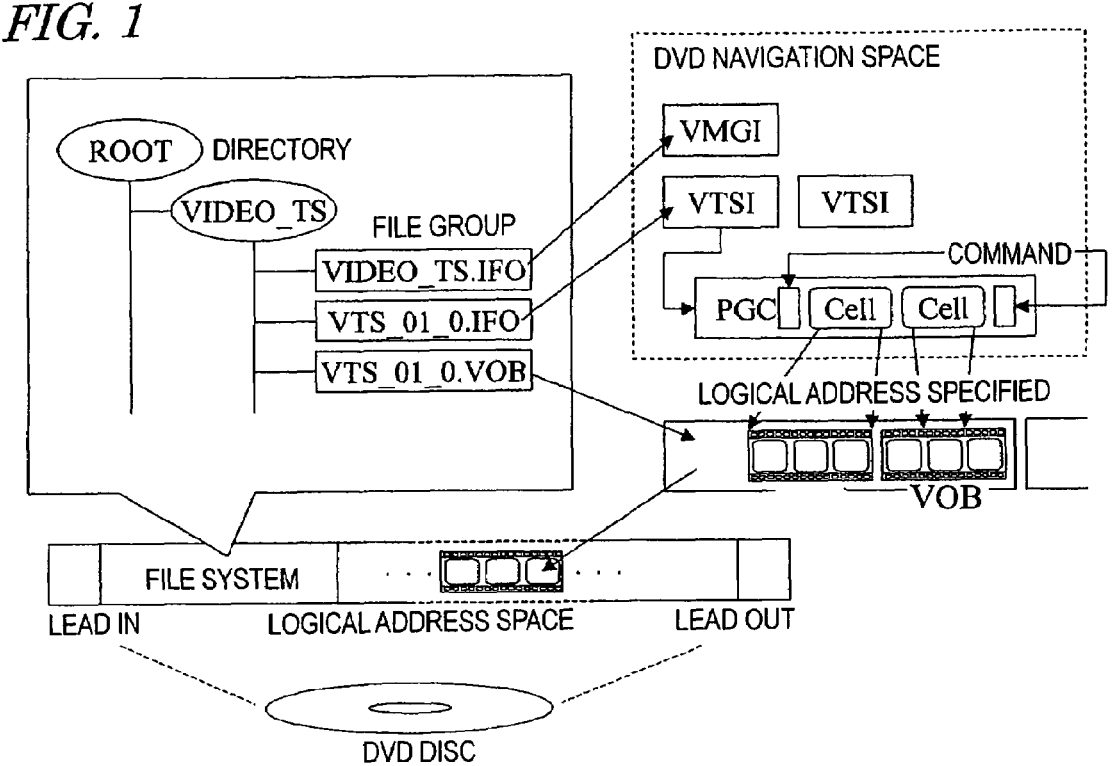
FIG. 1 shows the data structure of a DVD.
Figure 2:
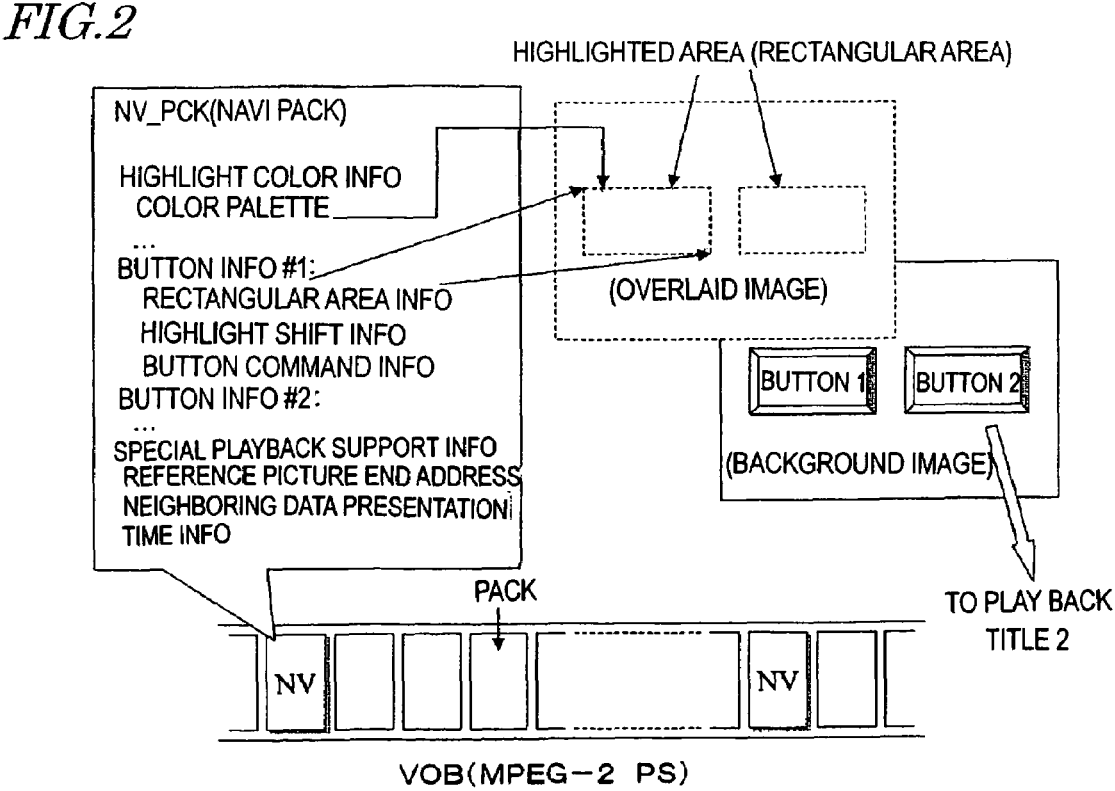
FIG. 2 shows various types of information included in the navigation information embedded in a stream.

Hereinafter, preferred embodiments of the present invention will be described. In the preferred embodiments of the present invention, HD video is written on a high-density storage medium such as Blu-ray Disc (which will be referred to herein as a "BD"), of which the storage capacity is several times as high as that of a DVD. Thus, in the following description of preferred embodiments, with the high-density storage medium supposed to be a BD, the configuration and operation of a player that can convert the HD video on a BD into SD video will be described.

First, a number of technical terms that will be used to describe the preferred embodiments of the present invention will be defined.

"Video" is herein supposed to be a group of pictures presented by switching one of those pictures after another at a predetermined vertical scanning frequency. The "video" includes motion pictures, still pictures, characters such as subtitles, and graphics. The motion and still pictures will be sometimes referred to herein as "primary video" and the subtitles and so on to be synchronized with, and superposed on, the primary video will be sometimes referred to herein as "auxiliary video";

"Picture" consists of two fields including odd-numbered lines and even-numbered lines, respectively, in an interlacing method and consists of just one frame in a progressive method. "Picture" is a concept that may mean either a frame or a field;

"SD video" refers herein to standard grade video (i.e., 480i video according to the NTSC standard and 576i video according to the PAL standard); and "HD video" refers herein to high definition video (e.g., so-called "High Vision" video in Japan) other than the SD video. The following Tables 1 and 2 show more specific examples of SD video motion pictures and HD video motion pictures. The 24p or 23.976p HD video in Table 2 is called "film material video":

TABLE 1

Resolution (number of lines) + type of scanning

|    | NTSC | PAL |
|----|------|-----|
| SD | 480i | 576i |
| HD | 480p | 576p |
|    | 720p | 720p |
|    | 1080i | 1080i | i: interlaced scanning,
p: progressive scanning

TABLE 2

Frequency (Hz) + type of scanning

|    | NTSC | PAL |
|----|------|-----|
| SD | 59.94i (≈60i) | 50i |
| HD | 59.94p (≈60p) | 50p |
|    | 24p | 24p |
|    | 23.976p | 23.976p | i: interlaced scanning,
p: progressive scanning

It should be noted that the 480p and 576p videos shown in Table 1 could be classified as non-HD videos. However, these videos are also treated herein as HD videos. The reason is as follows. Specifically, these videos can be converted by an interlaced-progressive (IP) conversion technique into NTSC-compliant 480i and PAL-compliant 576i, respectively, and can be displayed on a standard grade TV (SDTV). Thus, in terms of the applicable method of processing, these videos can be said to be equivalent to 720p and 1080i, which are generally treated as HD videos.

The following description will be itemized to make this invention more easily understandable. Following is the list of specific items to be described:

(1) Logical data structure on BD
(2) Player configuration
(3) Application space on BD
(4) Specifics of VOB
(5) VOB interleaved writing
(6) Navigation data structure
(7) Play list data structure
(8) How to generate events
(9) Virtual player machine
(10) Typical programs
(11) Flow of processing to be done by virtual player and
(12) Player performing down conversion processing It should be noted that one of the key processing techniques of the present invention is applied to down-converting HD video into SD video.

(1) Logical Data Structure on BD

Figure 4:
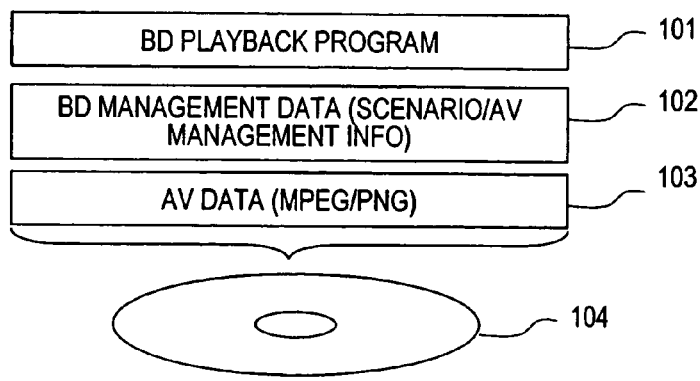
FIG. 4 shows a BD 104 as a disk storage medium and the structure of the data 101, 102 and 103 stored thereon.

FIG. 4 shows a BD 104 as a disk storage medium and the structure of the data 101, 102 and 103 stored thereon. Specifically, the data stored on the BD 104 include AV data 103, BD management information 102 such as AV data management information and AV playback sequence, and a BD playback program 101 contributing to interactivity. The following description of the preferred embodiment will be focused on the AV application of the BD (i.e., playing back the AV contents of a movie). Naturally, however, the BD may be used not only in this particular application but also in other applications as well.

Figure 5:
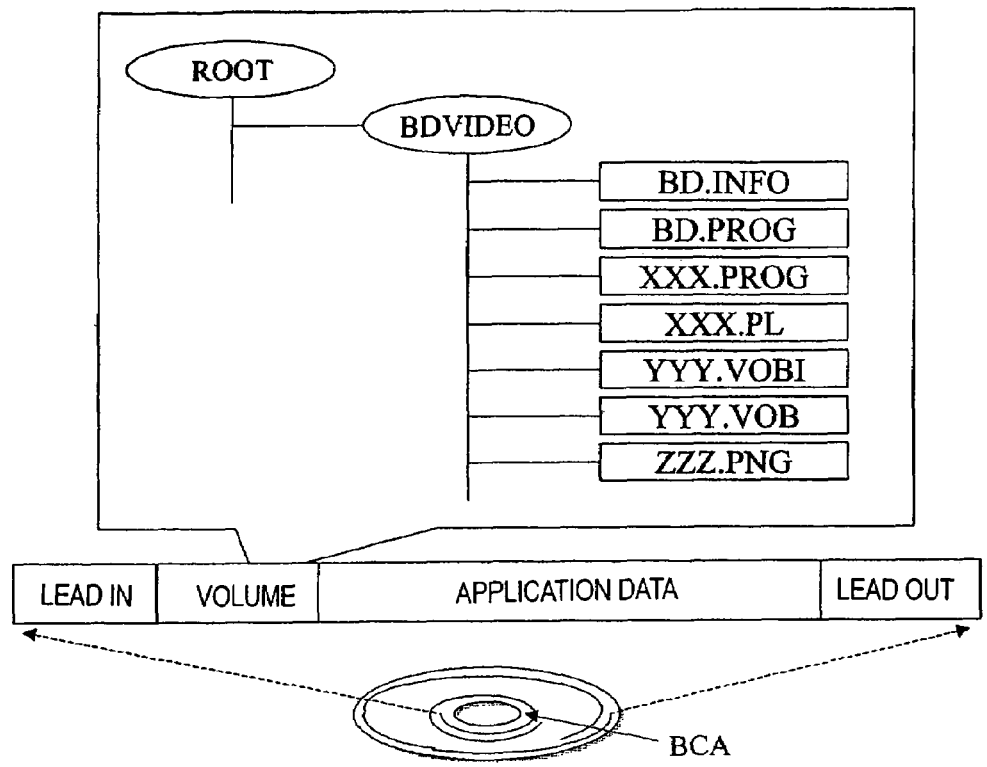
FIG. 5 shows the directory/file structure of the logical data stored on the BD.

FIG. 5 shows the directory/file structure of the logical data stored on the BD described above. Just like other optical discs (e.g., DVDs and CDs), the BD too has a spiral recording area extending from its innermost portion toward its outermost portion. Also, the BD, as well as the DVD, has a data area that can be accessed with a logical address specified (i.e., a logical address space). In addition, a burst cutting area (BCA), which is a special-purpose area that can be read only by the drive, is provided inside of the lead-in area thereof. This area is unreadable through an application and is sometimes used for the purpose of copyright protection, for example.

The logical address space is headed by file system information (or volume), which is then followed by application data such as video data. As already described for the background section, the file system is UDF, ISO 9660, or the like, and allows the user to read the stored logical data using the directory or file structure just like a normal PC.

In the directory/file structure on the BD of this preferred embodiment, a BDVIDEO directory is defined right under a root directory ROOT. This is a directory in which the data to be handled with the BD (such as the AV contents and management information, or the data 101, 102 and 103 shown in FIG. 4) is stored.

Under the BDVIDEO directory, the following seven types of files (a) through (g) are recorded:

(a) BD.INFO (of which the file name is fixed), which is a type of "BD management information" and which is a file that contains information about the overall BD. A BD player must read this file first;

(b) BD.PROG (of which the file name is fixed), which is one of "BD playback programs" and which is a file that contains playback control information about the overall BD;

(c) XXX.PL (where XXX is changeable but the extension "PL" is fixed), which is a type of "BD management information" and which is a file that contains play list information as a scenario (playback sequence). One file is included for each play list;

(d) XXX.PROG (where XXX is changeable but the extension "PL" is fixed), which is one of "BD playback programs" and which is a file that contains playback control information for each of the play lists described above. The association between this file and the play list is identified by the file body name (because "XXX" should be the same when the file and play list are associated with each other);

(e) YYY.VOB (where YYY is changeable but the extension "VOB" is fixed), which is a piece of "AV data" and which is a file that contains a VOB (that is the same as VOB as described for the background section). One file is included for each VOB;

(f) YYY.VOBI (where YYY is changeable but the extension "VOBI" is fixed), which is a type of "BD management information" and which is a file that contains stream management information for VOB as AV data. The association between this file and the VOB is identified by the file body name (because "YYY" should be the same when the file and VOB are associated with each other); and (g) ZZZ.PNG (where ZZZ is changeable but the extension "PNG" is fixed), which is another piece of "AV data" and which is a file that contains image data PNG (which is an image format standardized by W3C and which reads like "ping") to compose the subtitles and menu. One file is included for one PNG image.

(2) Player Configuration

Next, the configuration of a player for playing back the BD will be described with reference to FIGS. 6 and 7.

Figure 6:
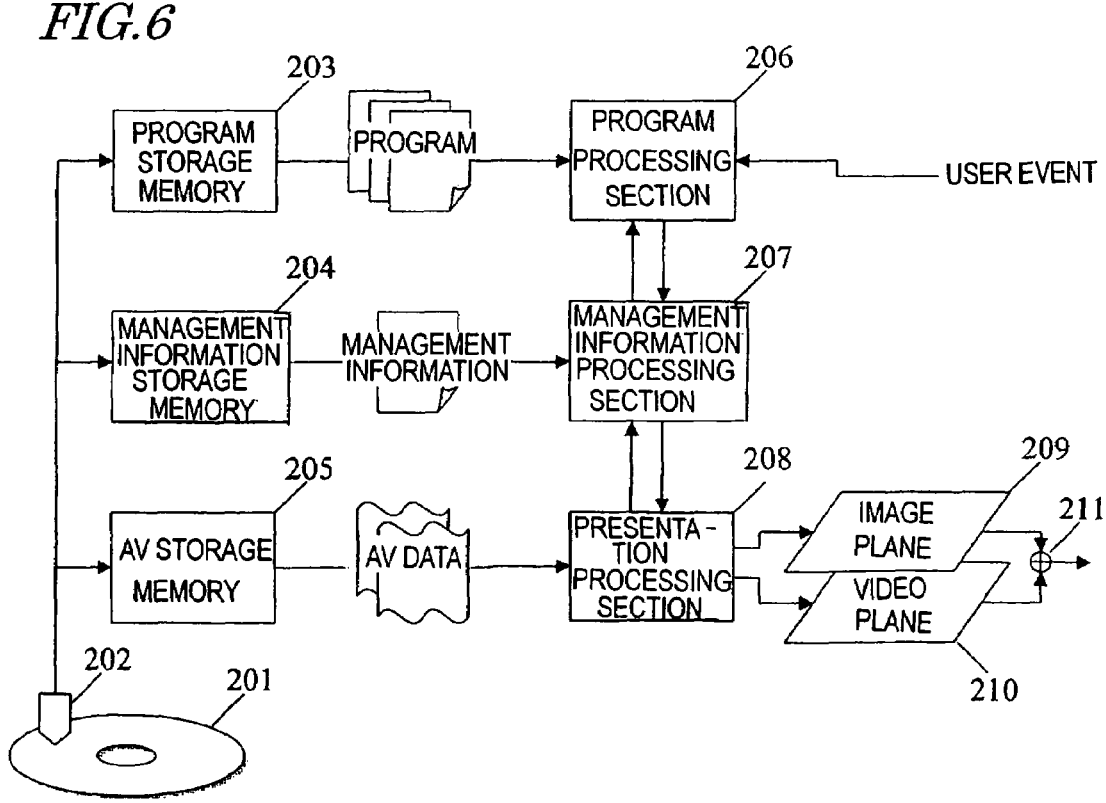
FIG. 6 shows a schematic functional configuration for a player for reading the VD data from the BD 201 and playing back the video.

FIG. 6 shows a schematic functional configuration for a player for reading the VD data from the BD 201 and playing back the video. The player includes an optical pickup 202, various memories including a program storage memory 203, a management information storage memory 204 and an AV storage memory 205, a program processing section 206 and a management information processing section 207.

The optical pickup 202 reads the data from the BD 201.

The program processing section 206 receives event information, including information about the play lists to be presented and information about the timing to execute the program, from the management information processing section 206, thereby processing the program. Also, the play lists to be presented can be changed dynamically in a program. To do so, a play list presenting instruction may be issued to the management information processing section 207. The program processing section 206 receives an event from the user (i.e., his or her request submitted by tapping remote controller keys) and executes a program corresponding to the user event if any.

In accordance with the instruction given by the program processing section 206, the management information processing section 207 analyzes the specified play lists and the management information of the VOBs associated with the play lists and instructs a presentation processing section 208 to play back the target AV data. Also, the management information processing section 207 receives reference time information from the presentation processing section 208 and instructs the presentation processing section 208 to stop playing back the AV data in accordance with the time information. Furthermore, the management information processing section 207 generates an event that shows the program processing section 206 the timing to execute the program.

The presentation processing section 208 includes three decoders for motion pictures, sound, and subtitles or images (i.e., still pictures), respectively, and decodes and outputs the AV data in accordance with the instruction given by the management information processing section 207. The motion picture data and the subtitles/images will be drawn on their dedicated planes, i.e., a video plane 210 and an image plane 209, respectively, after having been decoded.

A synthesis processing section 211 performs a video synthesizing process and outputs the resultant synthetic video to a TV or any other display device.

The processing is done by the player in the following flow. First, the data on the BD 201 is read out by the optical pickup 202 and then transferred to its dedicated memory according to the type of the data. Specifically, the BD playback program (i.e., the contents of the BD.PROG or XXX.PROG file) is transferred to the program storage memory 203. The BD management information (i.e., BD.INFO, XXX.PL or YYY.VOBI) is transferred to the management information storage memory 204. And the AV data (i.e., YYY.VOB or ZZZ.PNG) is transferred to the AV storage memory 205.

Then, the BD playback program stored in the program storage memory 203 is processed by the program processing section 206. The BD management information stored in the management information storage memory 204 is processed by the management information processing section 207. And the AV data stored in the AV storage memory 205 is processed by the presentation processing section 208.

The presentation processing section 208 decodes and outputs the motion pictures, sound and subtitles/images (i.e., still pictures). As a result, the motion picture data and subtitles/images are drawn on the video plane 210 and image plane 209, respectively. Then, the synthesis processing section 211 synthesizes the motion pictures and subtitles or images together and outputs the resultant synthetic video.

As can be seen, the BD player shown in FIG. 6 is designed based on the structure of the data stored on the BD as shown in FIG. 4.

Figure 7:
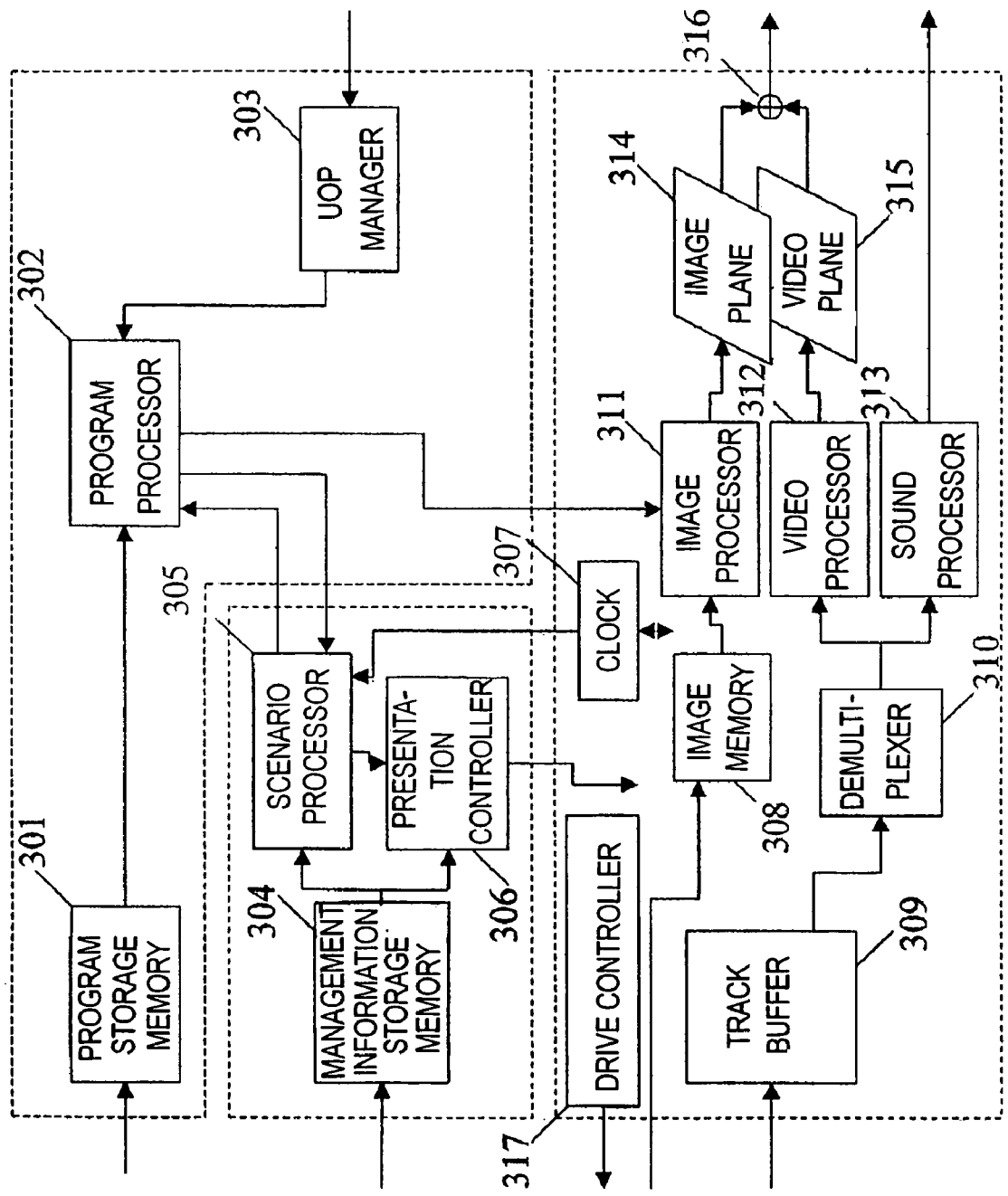
FIG. 7 shows a detailed functional block arrangement for the player.

FIG. 7 shows a detailed functional block arrangement for the player. The image memory 308 and track buffer 309 shown in FIG. 7 correspond to the AV storage memory 205 shown in FIG. 6. The program processor 302 and UOP manager 303 shown in FIG. 7 correspond to the program processing section 206. The scenario processor 305 and presentation controller 306 shown in FIG. 7 correspond to the management information processing section 207 shown in FIG. 6. And the clock 307, demultiplexer 310, image processor 311, video processor 312 and sound processor 313 shown in FIG. 7 correspond to the presentation processing section 208 shown in FIG. 6.

The MPEG stream (VOB data) and image data (PNG), which have been read out from the BD 201, are stored in the track buffer 309 and image memory 308, respectively. In accordance with the time shown by the clock 307, the demultiplexer 310 extracts the VOB data from the track buffer 309 and sends out the video data to the video processor 312 and the audio data to the sound processor 313, respectively. In compliance with the MPEG system standards, the video processor 312 and sound processor 313 are each made up of a decoder buffer and a decoder. That is to say, the video or audio data supplied from the demultiplexer 310 is temporarily stored in the decoder buffer and then decoded by the decoder in accordance with the time shown by the clock 307.

The PNG stored in the image memory 308 may be processed by one of the following two methods.

If the image data is subtitles, then the presentation controller 306 specifies the timing of decoding. The scenario processor 305 once receives the time information from the clock 307 and instructs the presentation controller 306 whether or not to display the subtitles when it's time to start or stop displaying the subtitles so as to show the subtitles appropriately. On receiving the decoding/presenting instruction from the presentation controller 306, the image processor 311 extracts the specified PNG data from the image memory 308, decodes the data, and then draws it on the image plane 314.

On the other hand, if the image data is a menu, then the program processor 302 specifies the timing of decoding. -However, it depends on the specific BD program being processed by the program processor 302 exactly what time the program processor 302 instructs the image decoding, and therefore, that timing is subject to change at any time.

As already described with reference to FIG. 6, the image data and video data are decoded, output to the image plane 314 and video plane 315, respectively, and then synthesized together and output by the synthesis processing section 316.

The management information (i.e., scenario information and AV management information) that has been read out from the BD 201 is stored in the management information storage memory 304. Thereafter, the scenario information (BD.INFO and XXX.PL) is fed into, and processed by, the scenario processor 305. Meanwhile, the AV management information (YYY.VOBI) is fed into, and processed by, the presentation controller 306.

The scenario processor 305 analyzes the play list information and tells the presentation controller 306 what VOBs are referred to by the play lists and where those VOBs should be played back. On the other hand, the presentation controller 306 analyzes the management information of the target VOB (i.e., YYY.VOBI) and instructs a drive controller 317 to read out the target VOB.

In accordance with the instruction given by the presentation controller 306, the drive controller 317 moves the optical pickup, thereby reading out the target AV data. The read AV data is once stored in either the image memory 308 and track buffer 309 as described above.

Also, a system processor 305 monitors the time shown by the clock 307 and transfers an event to the program processor 302 at the timing specified by the management information.

The BD program (i.e., BD.PROG or XXX.PROG) stored in the program storage memory 301 is executed and processed by the program processor 302. The program processor 302 processes the BD program when an event is transferred from either the scenario processor 305 or the UOP manager 303. When the user transmits his or her request by tapping remote controller keys, the UOP manager 303 generates an event for the program processor 302.

(3) Application space on BD

Figure 8:
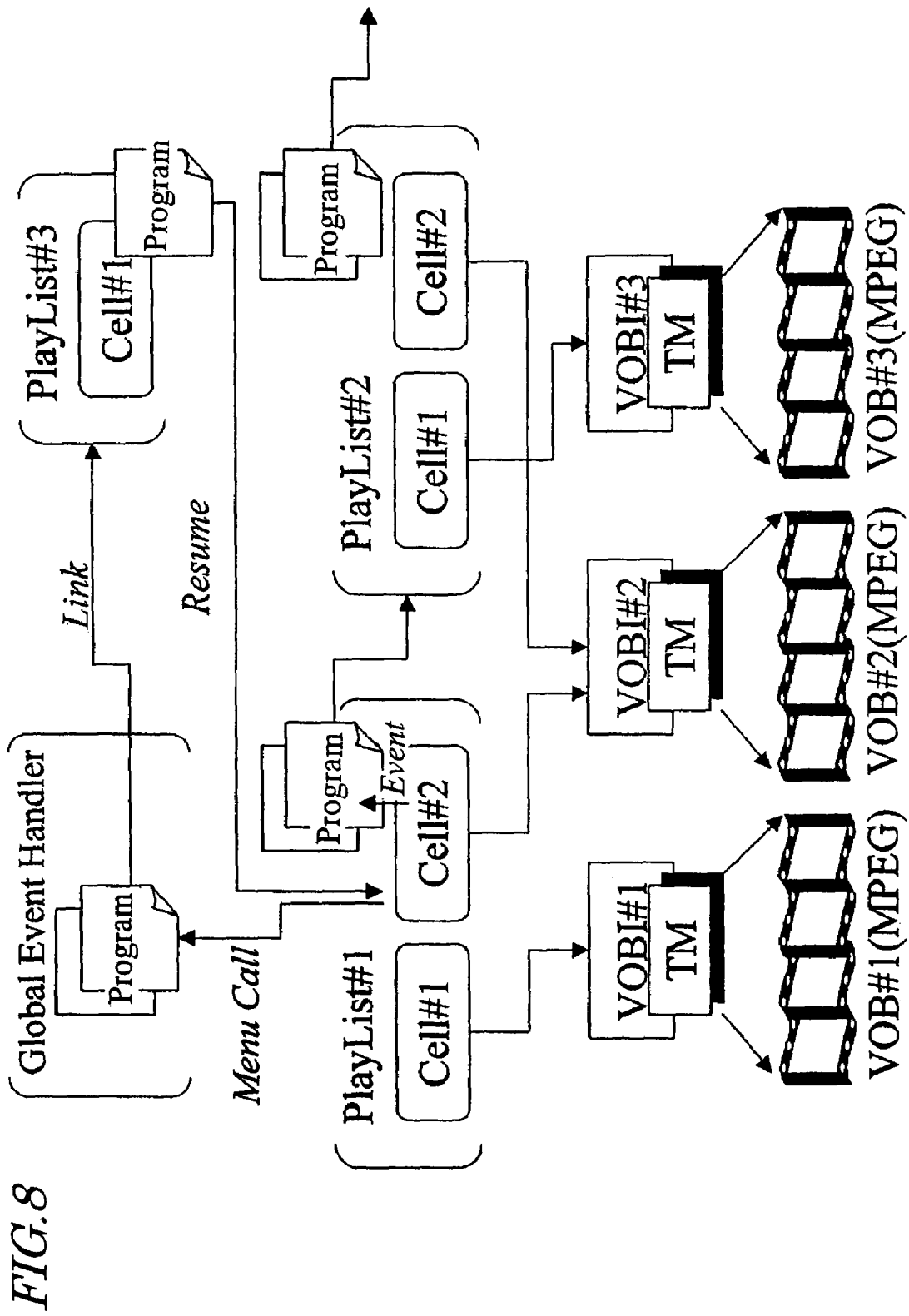
FIG. 8 shows the concept of an application space on the BD.

FIG. 8 shows the concept of an application space on the BD.

In the BD application space, a play list PlayList is used as a playback unit. Each play list has a static scenario, which is a playback sequence obtained by coupling a plurality of cells (Cell) together and defined by the order of coupling, and a dynamic scenario described by a program. Unless there is such a dynamic scenario described by the program, each play list defines only a procedure in which the respective cells are sequentially played back in their order. The playback by the play list finishes when all of those cells are played back. On the other hand, according to the program, a playback route across multiple play lists can be described. Thus, the playback targets can be changed dynamically according to the user's choice or the player status. Menu is a typical example of such dynamically changeable playback targets. And the menu can be defined as a scenario to be played back according to the user's choice. Thus, playback of a menu means dynamically selecting play lists according to a program.

Hereinafter, the program will be described in further detail. As used herein, the "program" refers to the handler of an event to be executed as either a time event or a user event.

The time event is generated in accordance with the time information embedded in a play list. The event transmitted from the scenario processor 305 to the program processor 302 as already described with reference to FIG. 7 is one such event. When the time event is issued, the program processor 302 executes its associated event handler, which is identified by its ID. As described above, the program to be executed can specify the playback of another play list. In that case, the playback of the current play list is stopped and switched into the playback of that specified play list.

The user event is generated by the user's manipulations of remote controller keys. The user events are roughly classified into the following two types.

A user event of a first type is a menu selection event to be generated by manipulating particular keys. Examples of the particular keys include BD "play" key, the cursor keys (including "up", "down", "right" and "left" keys) of the body or the remote controller, and "enter" key. An event handler corresponding to the menu selection event is effective only within a limited period of the play list. The play list information includes the effective periods of respective event handlers. When a particular key is pressed down, an effective event handler is searched for. If an effective event handler is found, then the event handler is executed. Otherwise, the menu selection event is ignored.

A user event of a second type is a menu calling event to be generated by manipulating particular keys. Examples of the particular keys include BD "play" key and the "menu" key of the body or the remote controller. When the menu calling event is generated, a global event handler is called. The global event handler is an event handler that is always effective without depending on the play list. By using this function, a DVD menu call (i.e., the function of calling an audio or subtitle menu while a title is being played back, changing the audio or subtitle, and then resuming the playback of the title from the suspended point) can be executed.

A cell Cell as a unit that makes up a static scenario in a play list refers to part or all of the playback section of a VOB (or MPEG stream). The cell carries the information about the VOB playback section as start/end time information. The VOB management information VOBI, which is paired with each VOB, includes a time map TM, which is write address table information associated with data reading time. By using this time map, the VOB playback start and end times can be derived from the reading start and end addresses within the VOB (i.e., within the target file "YYY.VOB"). The time map will be described in further detail later.

(4) Specifics of VOB

Figure 9:
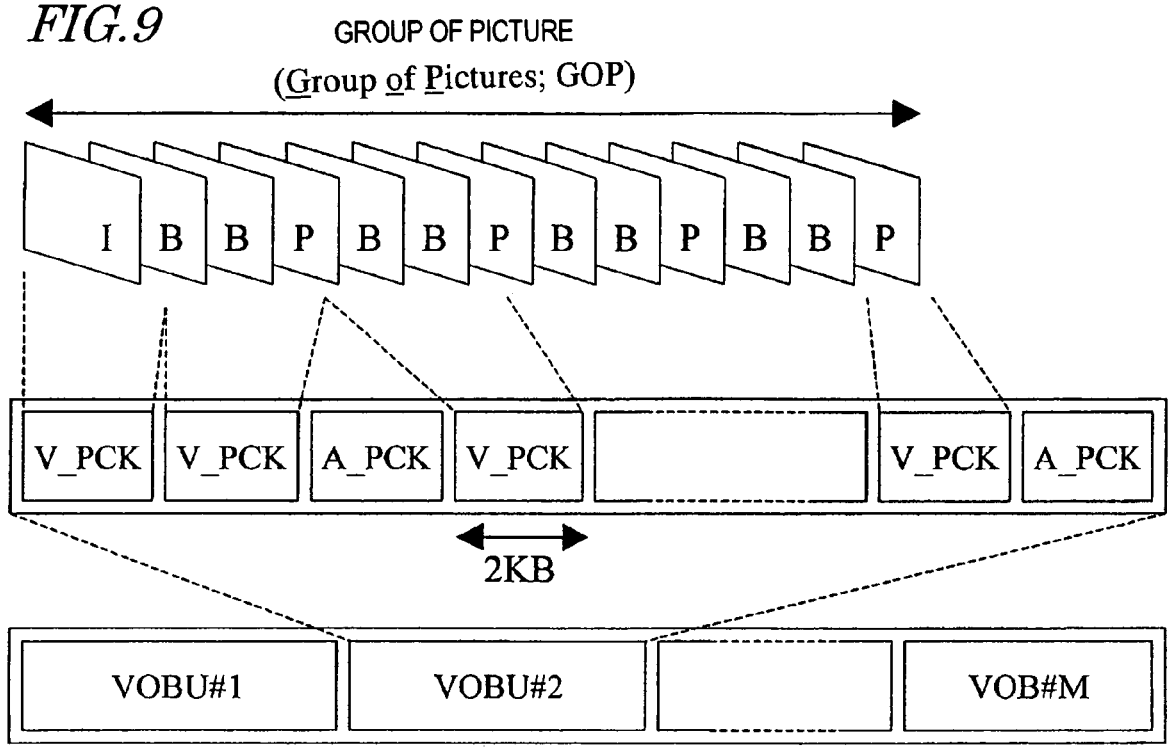
FIG. 9 shows a relationship between video pictures and the data structure of an MPEG stream.

FIG. 9 shows a relationship between video pictures and the data structure of an MPEG stream. The VOB data structure shown at the bottom includes at least one video object unit (VOBU). Each VOBU includes video packs V_PCK and audio packs A_PCK, each of which is of the same size as one sector (e.g., 2 KB in this preferred embodiment).

A VOBU is one playback unit of a multiplexed stream, which is based on a group of pictures (GOP) in an MPEG video stream and additionally includes audio data and so on as well. A VOBU contains data corresponding to a video playback time ranging from 0.4 to 1.0 second (usually about 0.5 second). That is to say, in NTSC, about 15 frames are stored in one GOP in many cases.

Figure 10:
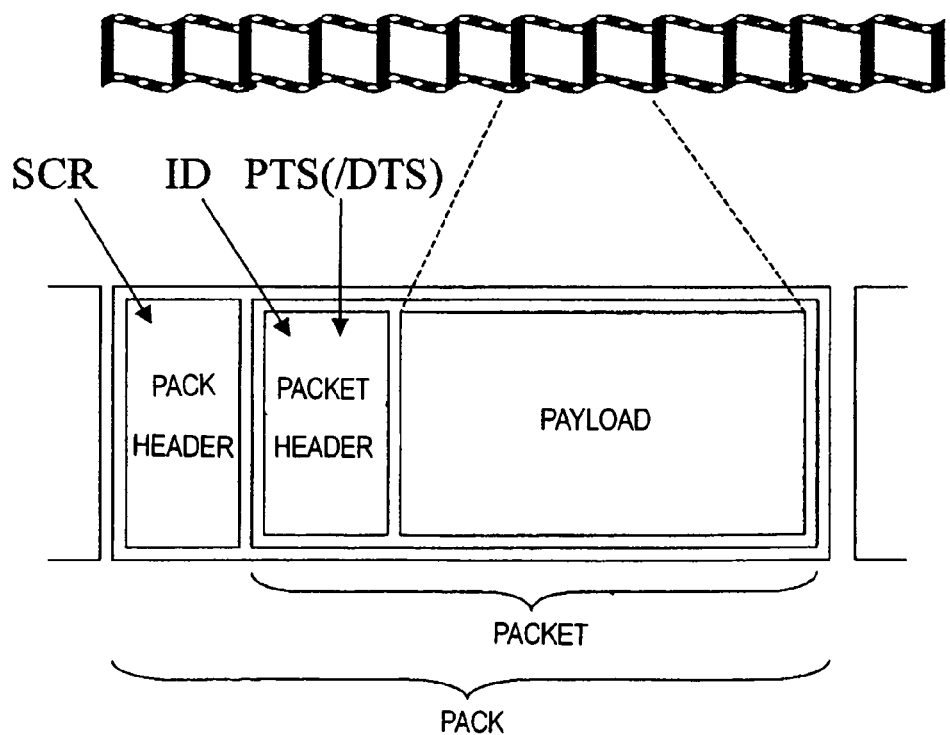
FIG. 10 shows the data structure of a pack.

FIG. 10 shows the data structure of a pack. The pack includes a pack header, a PES packet header and a PES packet payload. The packet header and payload together makes up one PES packet.

The payload is the data storage area of the PES packet. Elementary data such as video data or audio data is sequentially stored in the payload from the beginning. In the packet header, an ID stream_ID for use to identify what data stream is stored in the payload and a decoding time stamp DTS and a presentation time stamp PTS, which are time stamps carrying information about the decoding and presentation times of the payload, are stored. It should be noted that PTS and DTS are not stored in every packet header.

In the pack header, a time stamp system clock reference SCR, representing when the pack will pass the demultiplexer and be input to the decoder buffer of each elementary stream, is recorded.

(5) VOB Interleaved Writing

Next, the processing of reading a VOB file, which was written by an interleaving technique, will be described with reference to FIGS. 11 and 12.

Figure 11:
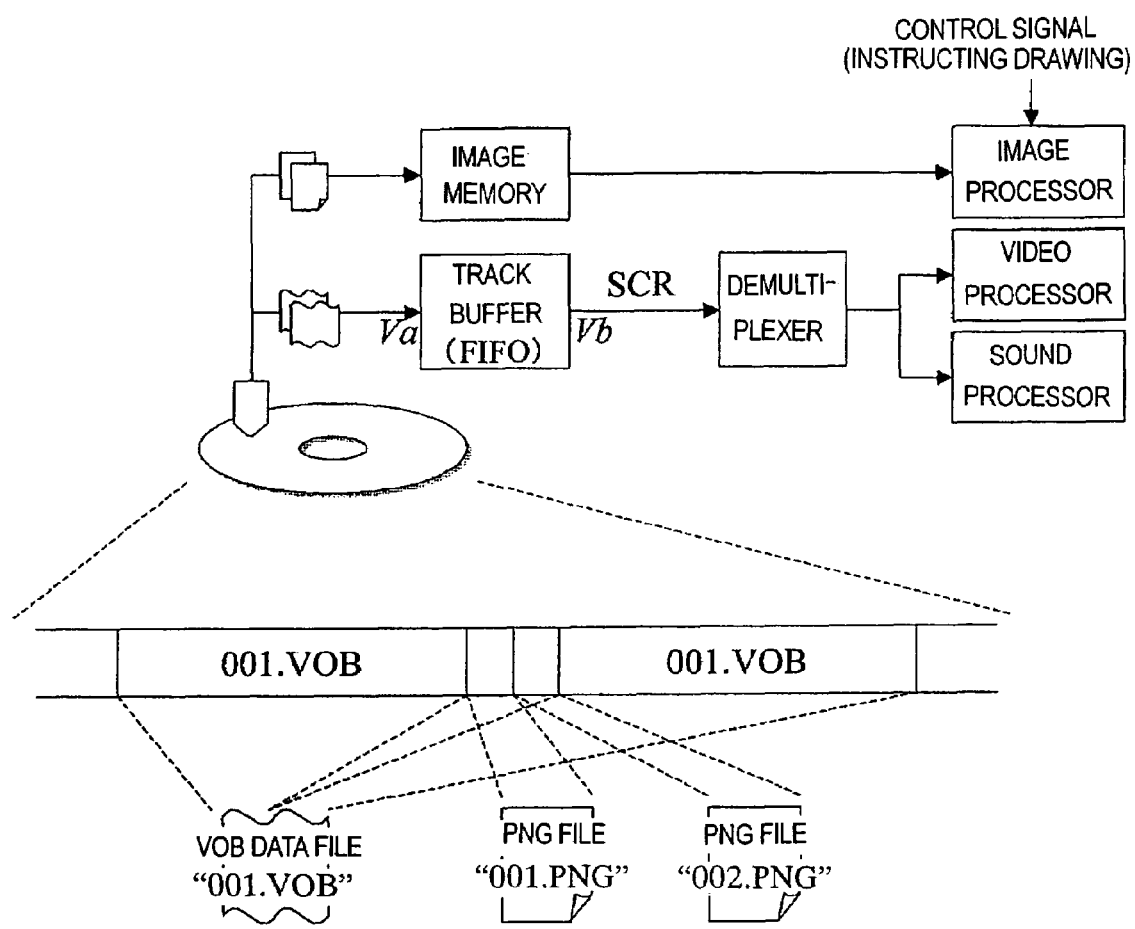
FIG. 11 shows VOB data files, their associated files, and a functional block arrangement for a player for reading these files.

FIG. 11 shows VOB data files, their associated files, and a functional block arrangement for a player for reading these files.

The lower part of FIG. 11 shows how VOB data files and PNG files are written on a BD so as to be interleaved with each other. As shown in FIG. 11, the VOB data file is divided into multiple sections, which are arranged discretely on the disc. To jump from one continuous interval to another, a seek operation needs to be carried out and data reading must be stopped during the seek operation. That is to say, the supply of data might be stopped.

On a normal ROM such as a CD-ROM or a DVD-ROM, AV data to be a series of continuous playback units are written continuously. This is because as long as the data was written there continuously, the drive just needs to read the data and pass them to the decoder sequentially, i.e., its processing is simplified. For that reason, the VOB data file is preferably written in a continuous area. Even so, a data structure like this is adopted because there are some additional data (e.g., subtitle data) to be played back synchronously with the video data in the VOB and because the subtitle data, as well as the VOB files, need to be read out from the BD in some way or other. That is why the VOB data file needs to be divided into several blocks, among which the image data for subtitles (i.e., the PNG files) need to be arranged.

According to an alternative method of reading subtitle data, the overall image data representing all subtitles (i.e., PNG files) are read out at a time before the VOB starts being read out. However, this method is impractical because a huge memory would be needed in that case.

Thus, by appropriately interleaving the VOB files and image data with each other, the image data can be stored in an image memory at a required timing without storing a huge amount of data in a single memory, albeit temporarily, as in the alternative method just mentioned.

This player functional block represents a part of the player described above. The data on the BD is read out by an optical pickup. The VOB data files (i.e., an MPEG stream) are input to a track buffer, while PNG (i.e., image data) files are input to an image memory.

The track buffer is a first-in, first-out (FIFO) buffer, which passes the incoming VOB data to a demultiplexer sequentially (i.e., in the order of input). In this case, each pack is extracted from the track buffer according to the SCR described above, and its data is transferred to a video processor or a sound processor by way of the demultiplexer. As to the image data on the other hand, it is the presentation controller that instructs which image should be drawn. The image data that has been used for drawing subtitles is deleted from the image memory simultaneously. Meanwhile, the image data for a menu is left as it is in the image memory while the menu is being drawn. This is because the menu drawing depends on the user's operation. That is to say, a portion of the menu may be re-displayed or replaced with another image in accordance with the user's instruction. Thus, it would be easier to decode the image data of the portion to be re-displayed if the menu image data were left there as it is.

Figure 12:
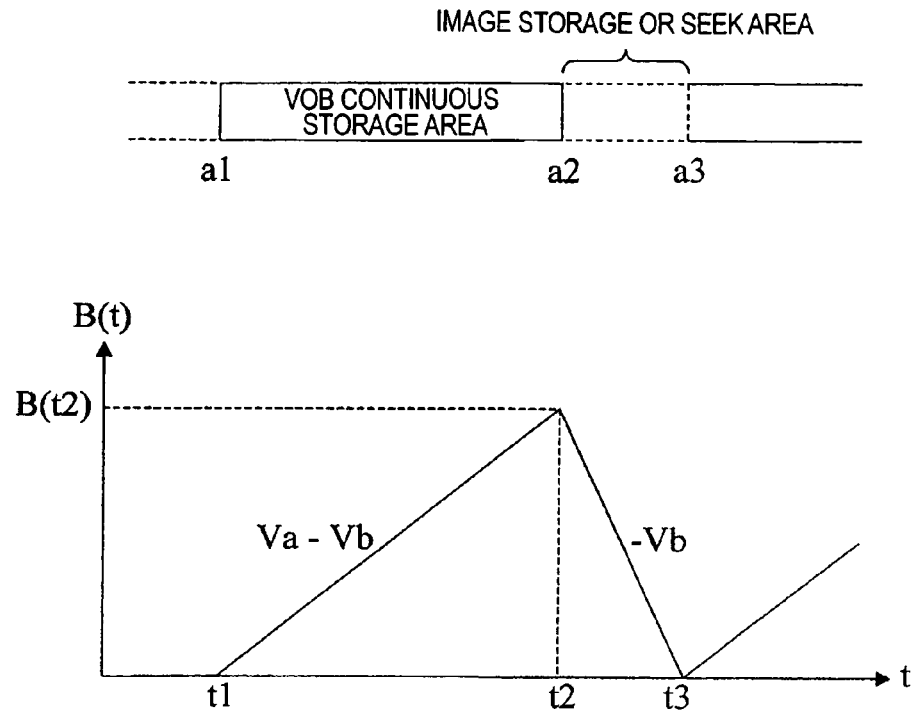
FIG. 12 shows a VOB data continuous supply model using a track buffer.

FIG. 12 shows a VOB data continuous supply model using a track buffer. First, a VOB continuous storage area is supposed to range from a logical address a1 to a logical address a2 as shown in the upper part of FIG. 12. The following range from a2 to a3 is supposed to be an interval in which the image data is written and from which no VOB data can be read out.

The VOB data is temporarily stored in the track buffer. Accordingly, if there is a difference between the rate Va of inputting the data to the track buffer and the rate Vb of outputting the data from the track buffer (where Va>Vb) and as long as the data continues being read out from the BD, the amount of data accumulated in the track buffer continues to increase. The lower part of FIG. 12 shows how the amount of data stored in the track buffer changes. The abscissa represents the time and the ordinate represents the amount of data accumulated in the track buffer. The time t1 is a point in time when the data starts being read from the VOB continuous storage area at the logical address a1. As of this time t1, the data will be accumulated in the track buffer at a rate of Va−Vb, which is the difference between the track buffer input and output rates. The time t2 is a point in time when the data has been read out fully from the continuous storage area at the logical address a2. In the interval between the times t1 and t2, the amount of data in the track buffer increases at the rate Va−Vb. And the amount of data accumulated at the time t2 (B(t2)) is given by:

$$B(t2)=(Va-Vb)\times(t2-t1) \quad (1)$$

Thereafter, the image data lasts until the address a3 on the BD, and therefore, the input to the track buffer becomes zero and the amount of data in the track buffer decreases at the rate of −Vb, which is the output rate. This state continues until the readout position a3 (i.e., the time t3).

It should be noted that if the amount of data accumulated in the track buffer became equal to zero before the time t3, there would be no VOB data anymore to supply to the decoder and the playback of the VOB might stop. In other words, if the data still remained in the track buffer at the time t3, then the VOB can be played back continuously without stopping.

This condition is represented by the following inequality:

$$B(t2)\geqq -Vb\times(t3-t2) \quad (2)$$

That is to say, the arrangement of the image data (i.e., non-VOB data) needs to be determined so as to satisfy the inequality (2).

(6) Navigation Data Structure

The BD navigation data (i.e., BD management information) structure will be described with reference to FIGS. 13 through 1.

Figure 13:
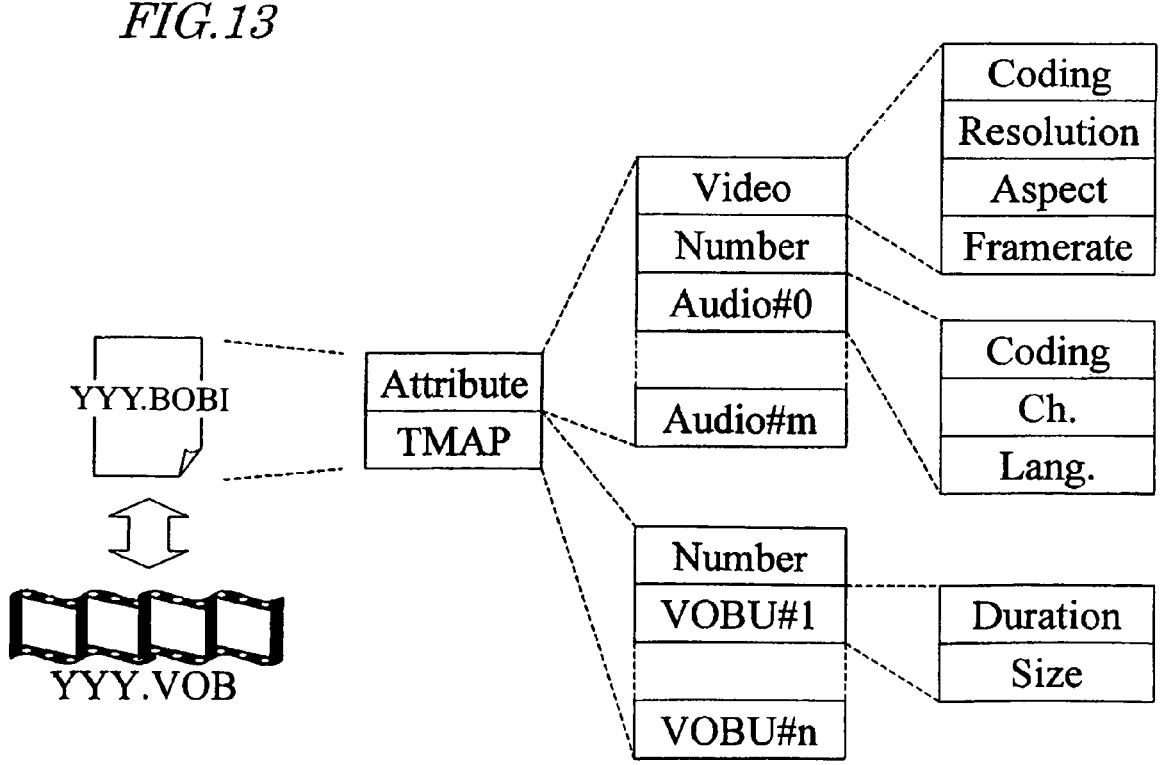
FIG. 13 shows the internal structure of the VOB management information file YYY.VOBI.

FIG. 13 shows the internal structure of the VOB management information file YYY.VOBI. The VOB management information includes the stream attribute information Attribute of the VOB and the time map TMAP thereof. The stream attribute includes a video attribute Video and respective audio attributes Audio #0 through Audio #m. In an audio stream among other things, a VOB can have multiple audio streams at the same time. Accordingly, the number of audio streams Number indicates whether or not there are any data fields.

The following is the fields that the video attribute Video has and their possible values:
Compression method Coding:
  MPEG 1
  MPEG 2
  MPEG 4 and MPEG 4-AVC (advanced video coding);

Resolution Resolution:
  1,920×1,080
  1,280×720
  720×480 and
  720×565;
Aspect ratio Aspect:
  4: 3 and
  16: 9;
Frame rate Framerate:
  60
  59.94 (60/1.001)
  50
  30
  29.97 (30/1.001)
  25
  24 and
  23.976 (24/1.001)

The following is the fields that the audio attribute Audio has and their possible values:
Compression method Coding:
  AC3
  MPEG 1
  MPEG 2 and
  LPCM
The number of channels Ch:
  1 through 8
Language attribute Language:

The time map TMAP is a table containing information about each VOBU, and includes the number of VOBUs Number that the VOB has and information about the respective. VOBUs VOBU #1 through VOBU #n. And the information about each VOBU includes the playback duration Duration and data size Size of the VOBU.

Figure 14:
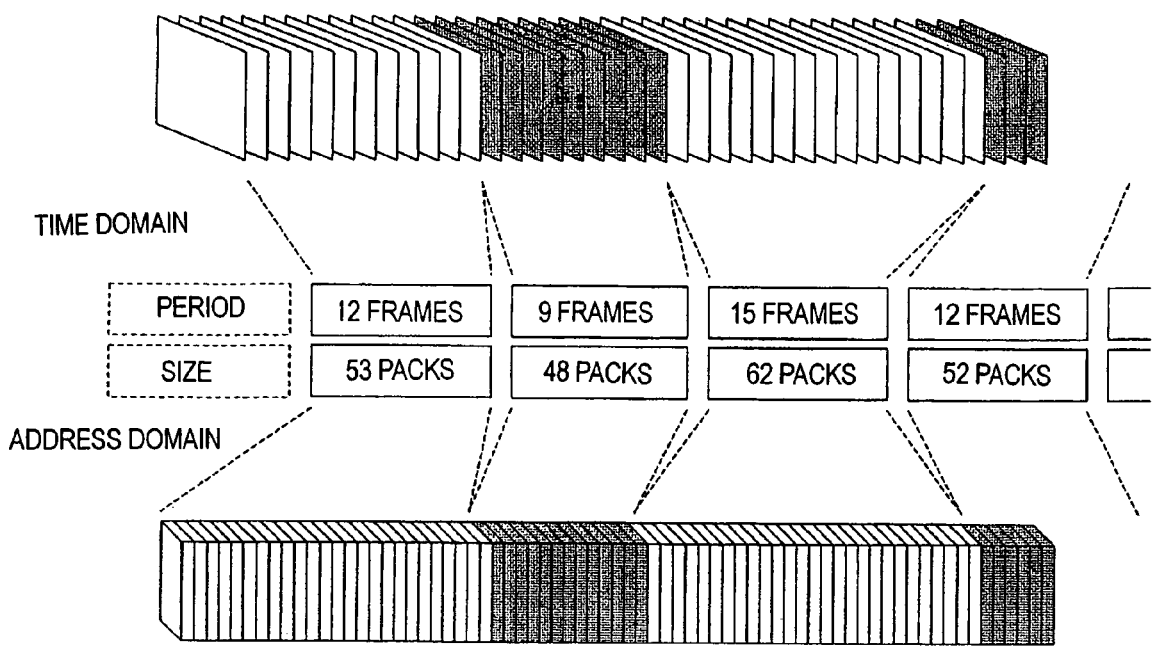
FIG. 14 shows correspondence between the playback duration and the data size of a VOBU. 5

FIG. 14 shows correspondence between the playback duration and the data size of a VOBU. According to AC3, which is an audio compression standard, the compression is done at a fixed bit rate, and therefore, the time-address relation can be derived by a linear equation. As for MPEG video, however, the time-address relation cannot be represented by a linear equation.

This is because an MPEG video stream may be generated by being subjected to a variable bit rate compression for the purpose of high-quality recording and there is no simple correlation between the playback duration and the data size thereof. In MPEG video data, each frame has a fixed presentation time. In an NTSC signal, for example, each frame has a presentation time of 1/29.97 second. However, the data size of each frame after the compression changes significantly with the property of the picture or the picture type used for the compression (i.e., I-, P- or B-picture).

In the same way, in an MPEG system stream obtained by multiplexing the MPEG video data (i.e., a VOB), the time-data size relation cannot be represented by a linear equation, either. Thus, information about the time-address correlation within a VOB is needed. The time map TMAP is provided for that purpose. As shown in FIG. 14, the time map TMAP has an entry that correlates the number of frames in each VOBU with the number of packs in the VOBU (i.e., the data size).

Figure 15:
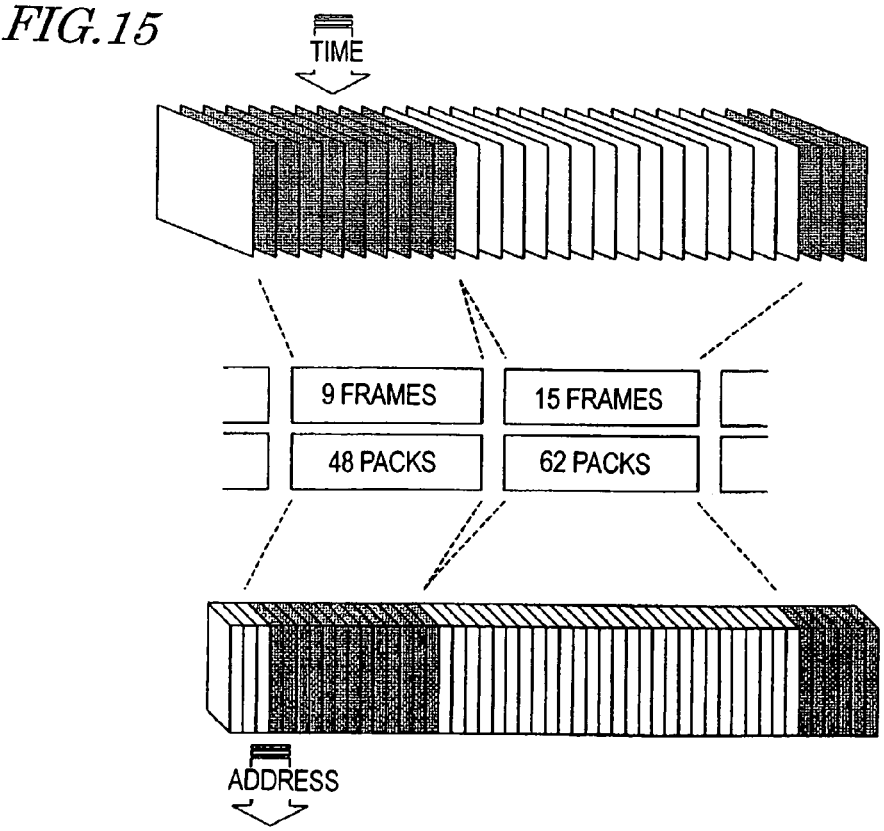
FIG. 15 shows the concept of processing for obtaining an address based on the playback duration of a VOBU.

The time map TMAP will be described more fully with reference to FIG. 15, which shows the concept of processing for obtaining an address based on the playback duration of a VOBU. First, when time information is given, a VOBU to which the time belongs is searched for. To do so, the numbers of frames of VOBUs on the time map may be added together, thereby finding a VOBU in which the sum of the numbers of frames is equal to or greater than a particular number of frames representing that time by conversion. Next, the data sizes of the respective VOBUs on the time map are also added together up to the previous VOBU for the given VOBU. This value is used to obtain the address of the pack to read for the purpose of playing back a frame including the given time.

(7) Play List Data Structure

Figure 16:
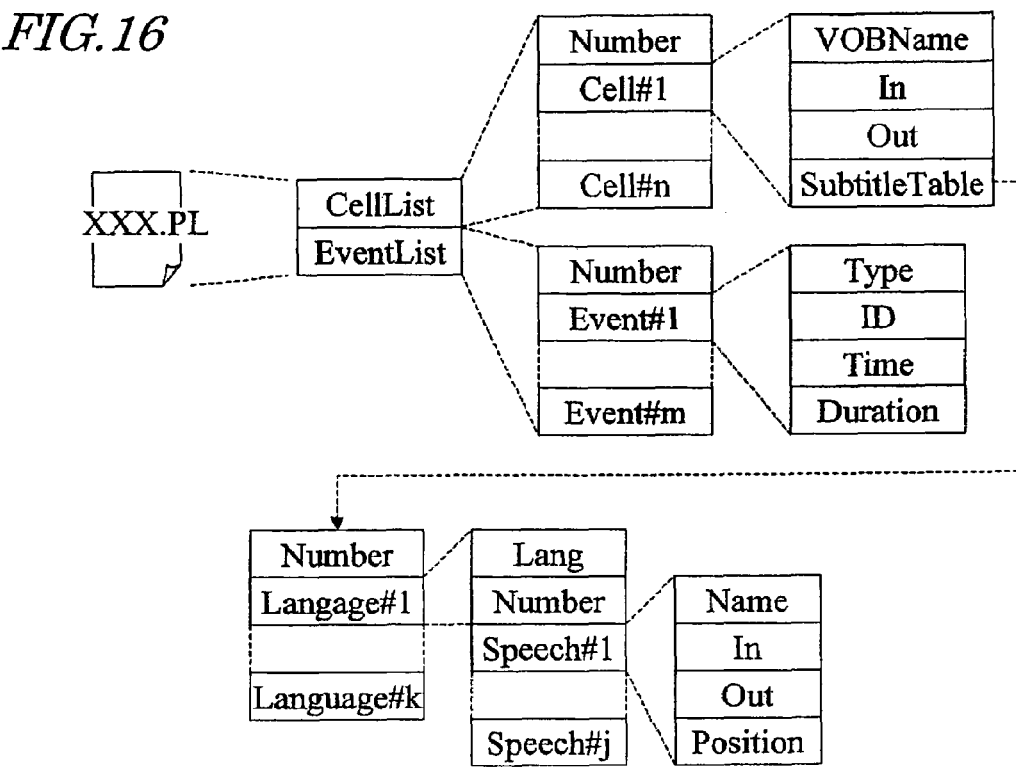
FIG. 16 shows the data structure of the play list information.

Next, the data structure of the play list information XXX.PL will be described with reference to FIG. 16. FIG. 16 shows the data structure of the play list information. The play list information consists of a cell list CellList and an event list EventList.

The cell list CellList shows the sequence of cells to play back from the play list. That is to say, the cells will be played back in the order described in this list. The contents of the cell list CellList include the number of cells Number and information about respective cells Cell #1 through Cell #n.

The information about each cell Cell # includes the file name of the VOB VOBName, the start time In and end time Out within the VOB, and a subtitle table SubtitleTable. The start and end times In and Out are represented by the numbers of frames within the VOB. By using the time map TMAP described above, the address of the VOB data required for playback can be obtained.

The subtitle table SubtitleTable contains information about the subtitles to be played back synchronously with the VOB in question. The subtitles, as well as the sound, can have multiple versions in different languages. Thus, the top information of the subtitle table SubtitleTable is the number of languages Number included, which is followed by tables for the respective languages Language #1 through Language #k.

The table for each language Language # consists of language information Lang, the number of subtitle information Number of the subtitles to be presented, and the. subtitle information Speech #1 through Speech #j of the subtitles to be presented. Each subtitle information Speech # includes the file name Name of its associated image data, subtitle presentation start time In and end time Out and subtitle display position Position.

The event list EventList is a table that defines the events to occur within the play list. The event list includes the number of events Number, which is followed by respective events Event #1 through Event #m. And each event Event # consists of the type of the event Type, the ID of the event ID, the time of occurrence of the event Time and the duration of the event Duration.

Figure 17:
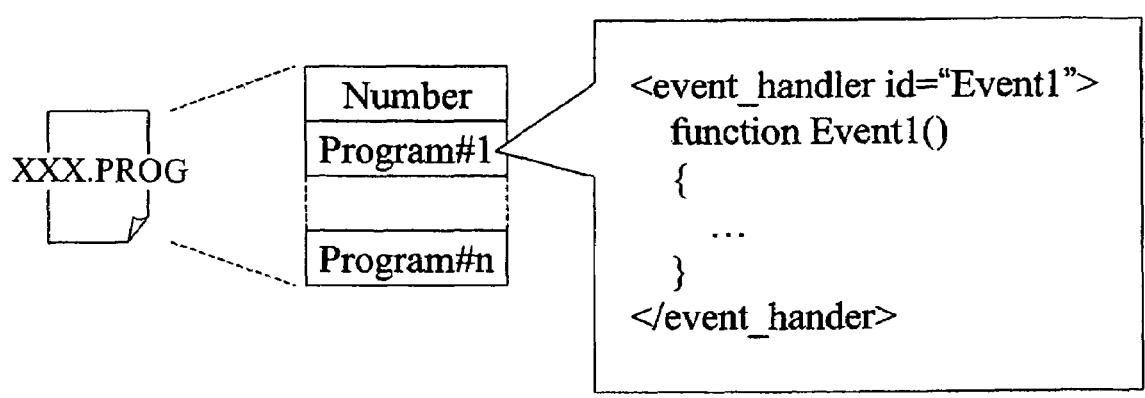
FIG. 17 shows the data structure of an event handler table XXX.PROG.

FIG. 17 shows the data structure of an event handler table XXX.PROG. The event handler table XXX.PROG includes event handlers (i.e., a time event and a user event for menu selection) for each play list.

The event handler table includes the number of event handlers/programs defined Number and the respective event handlers/programs Program #1 through Program #n. The description of each event handler/program Program # includes the definition of the beginning of the event handler (i.e., <event_handler>tag) and an event handler ID ID to be paired with the event ID described above. Thereafter, the program in question is also described between the parentheses { and } following Function. The events Event #1 through Event #m stored in the event list EventList of XXX.PL described above are identified by the event handler ID ID of XXX.PROG.

Figure 18:
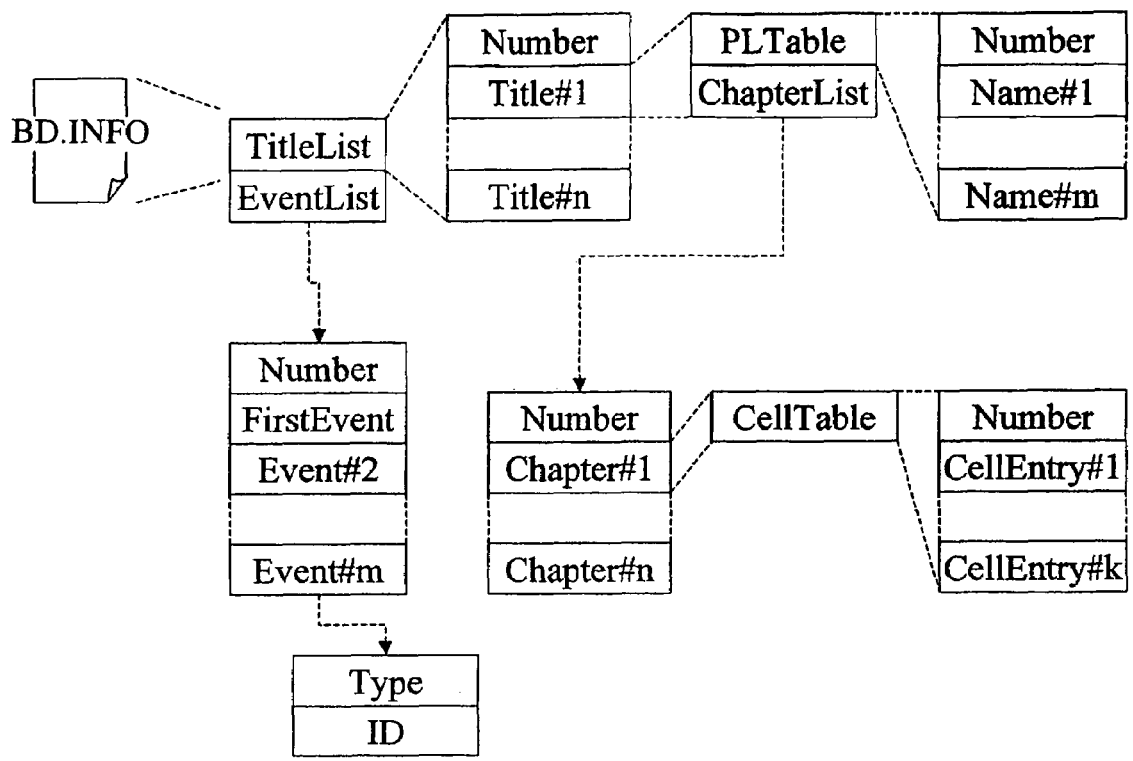
FIG. 18 shows the data structure of information about an overall BD.

Next, the internal structure of information BD.INFO about the overall BD will be described with reference to FIG. 18. FIG. 18 shows the data structure of the information about the overall BD.

The information about the overall BD includes a title list TitleList and an event table EventList for global events.

The title list TitleList consists of the number of titles Number in the disc and respective title information Title #1 through Title #n following it. Each title information Title # includes the play list table PLTable included in the title and a chapter list ChapterList within the title. The play list table PLTable includes the number of play lists Number in the title and the file names of the play lists Name.

The chapter list ChapterList consists of the number of chapters Number included in the title and respective chapter information Chapter #1 through Chapter #n. Each chapter information Chapter # includes the table of cells CellTable included in the chapter. The cell table CellTable consists of the number of cells Number and respective cells' entry information CellEntry #1 through CellEntry #k. Each cell entry information CellEntry # is described by the name of the play list including that cell and the number of that cell in the play list.

The event list EventList includes the number of global events Number and respective global events' information. It should be noted that the global event to be defined first is called FirstEvent that is the event to be read first after the BD has been loaded into a player. Each global event information includes only an event type Type and an event ID ID.

Figure 19:
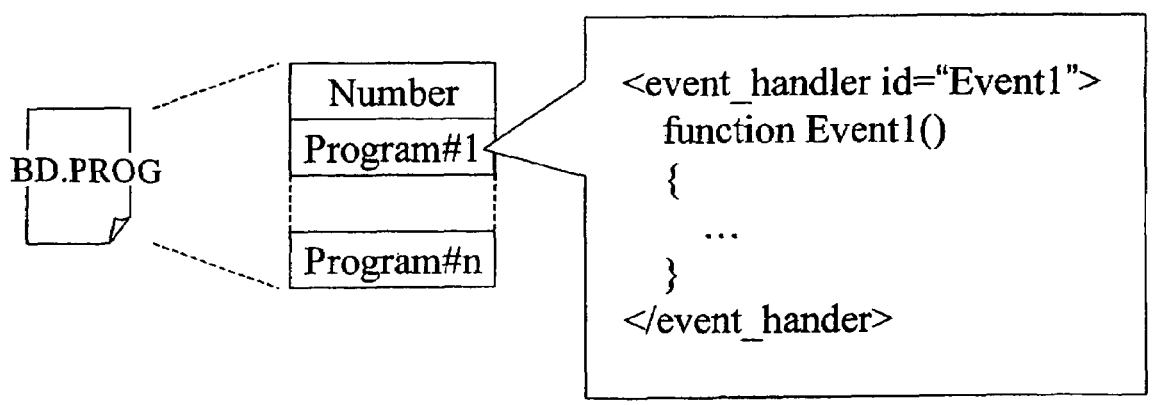
FIG. 19 shows the program table BD.PROG of a global event handler.

FIG. 19 shows the program table BD.PROG of a global event handler. This table has the same contents as the event handler table that has already been described with reference to FIG. 17.

(8) How to Generate Events

Next, it will be described with reference to FIGS. 20 through 22 how to generate events.

Figure 20:
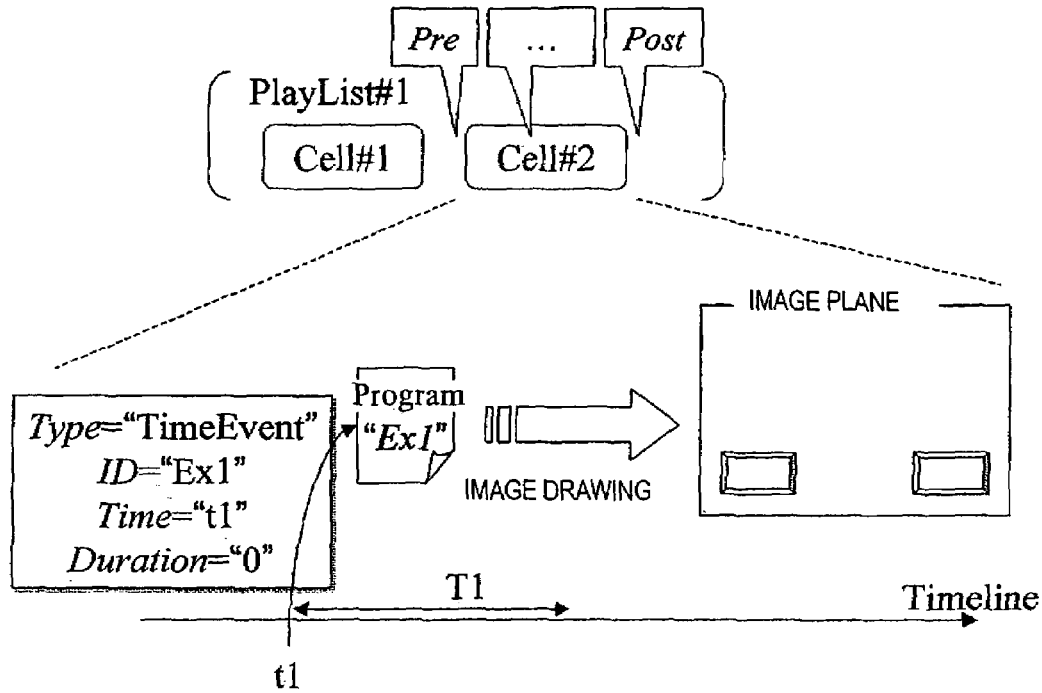
FIG. 20 shows the concept of a time event.

FIG. 20 shows the concept of a time event. As described above, a time event is defined by the event list EventList of the play list information XXX.PL. If the given event is defined as a time event (i.e., if the event type Type is TimeEvent), a time event having an ID Ex1 is passed from the scenario processor to the program processor when it is the time t1 to generate the event. The program processor looks for an event handler with the event ID Ex1 and executes the event handler in question. For example, in this preferred embodiment, the program processor may draw an image representing two buttons.

Figure 21:
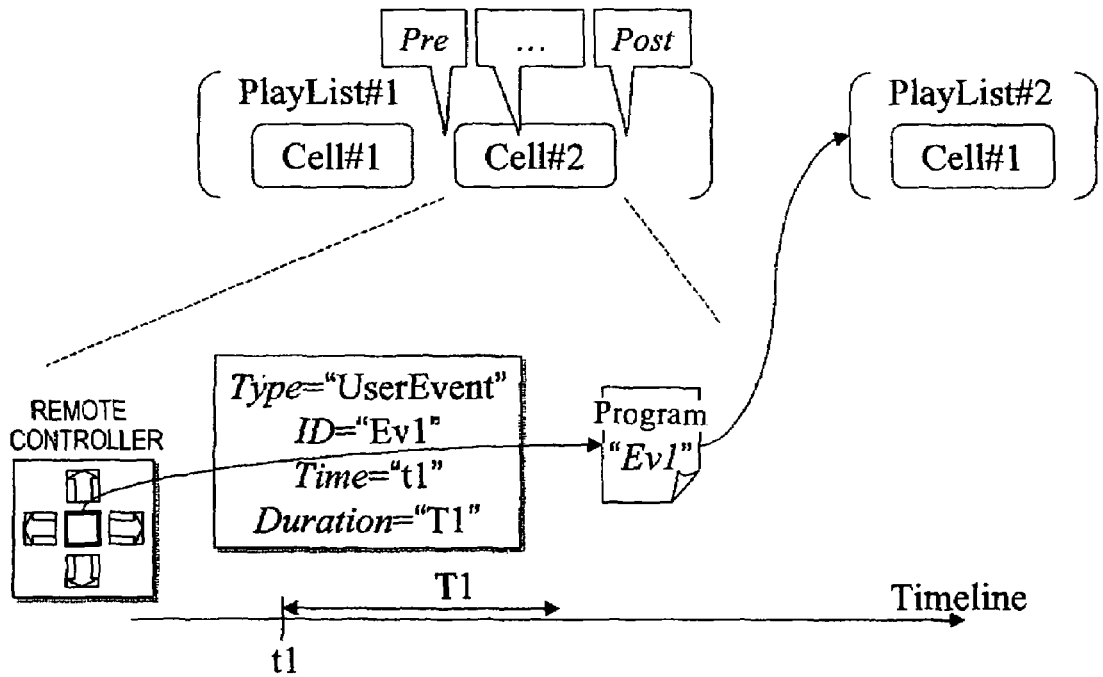
FIG. 21 shows the concept of a user event of menu selection.

FIG. 21 shows the concept of a user event of menu selection.

As described above, the user event of menu selection is also defined by the event list EventList of the play list information XXX.PL. If the given event is defined as a user event (i.e., if the event type Type is UserEvent), the user event gets ready when it is the time t1 to generate the event. At this point in time, however, the event itself has not been generated yet. That event is ready to enter its effective period described by duration information Duration.

As shown in FIG. 21, when the user presses down the "up", "down", "left", "right" or "enter" key of the remote controller, first, an UOP event is generated by a UOP manager and passed to the program processor. The program processor passes the UOP event to the scenario processor. In response, the scenario processor determines whether or not there is any valid user event at the time of receipt of the UOP event. If there is such a user event, the scenario processor generates the user event and passes it to the program processor. The program processor searches for an event handler with the event ID Ev1 and then executes the event handler in question. For example, in this preferred embodiment, the program processor starts playing back the play list #2.

The user event to be generated includes no information about what remote controller key has been pressed down by the user. Instead, the information about the selected remote controller key is conveyed by the UOP event to the program processor and then stored and retained in a register SPRM 8 that the virtual player has. The event handler program can execute branch processing by checking out this register value.

Figure 22:
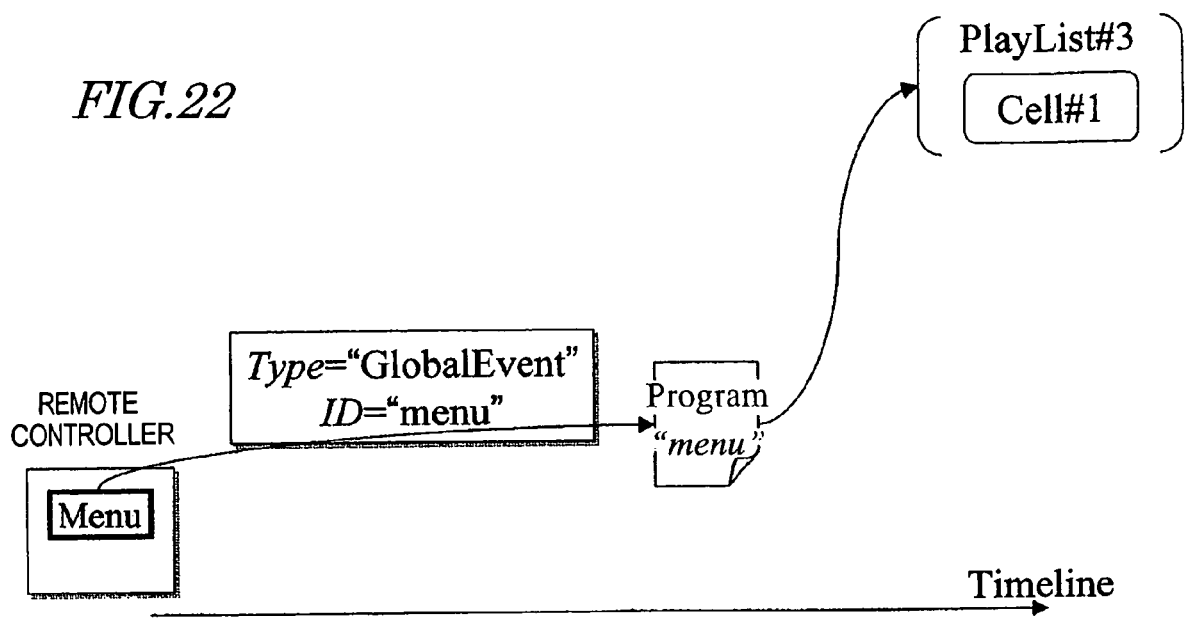
FIG. 22 shows the concept of a global event.

FIG. 22 shows the concept of a global event. As described above, the global event is defined by the event list EventList of the information BD.INFO about the overall BD. If the given event is defined as a global event (i.e., if the event type Type is GlobalEvent), that event is generated only when the user presses a remote controller key.

For example, if the user has pressed down the "menu" key, a UOP event is generated by the UOP manager and then passed to the program processor. The program processor passes the UOP event to the scenario processor. In response, the scenario processor generates a corresponding global event and passes it to the program processor. The program processor searches for an event handler with the event ID Menu and then executes the event handler in question. For example, in this preferred embodiment, the program processor starts playing back the play list #3.

In this example, the "menu" key is supposed to be single and called "the" menu key. Optionally, a plurality of menu keys may be provided as in a DVD player. In that case, IDs Just need to be defined for the respective menu keys.

(9) Virtual Player Machine

Figure 23:
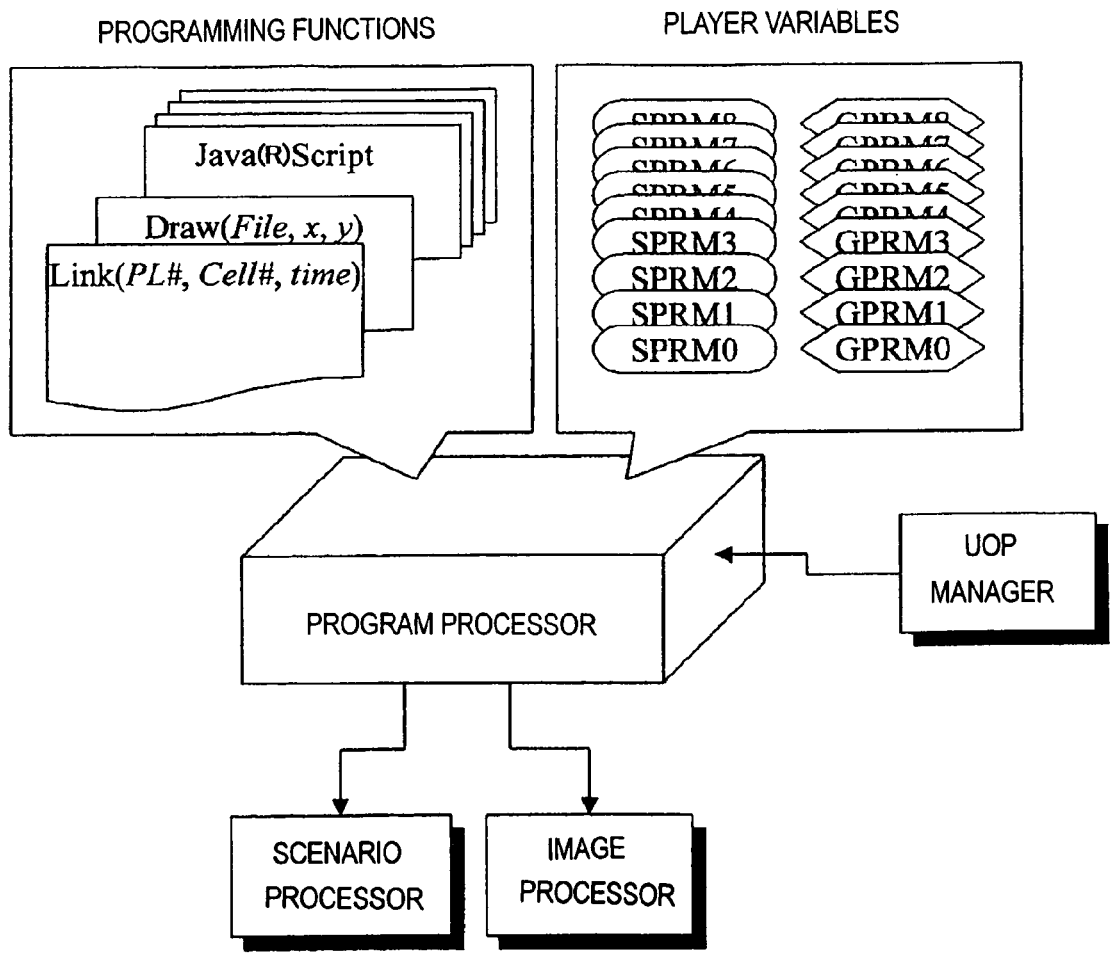
FIG. 23 shows the arrangement of functional blocks associated with the program processor.

The functions of the program processor will be described with reference to FIG. 23. FIG. 23 shows the arrangement of functional blocks associated with the program processor. The program processor is a processing module including a virtual player machine inside. The virtual player machine is a functional model defined with respect to a BD and never depends on any specific implementation of a BD player. Thus, the virtual player machine guarantees that the same functions are achievable by any BD player. For example, the configuration shown in FIGS. 6 and 7 suppose that the virtual player machine has the functions to be described below.

The virtual player machine has two primary functions: programming function a, b and c and player variables (registers). The programming function may define the following two functions as BD proper functions based on Java™ Script, for example:

(a) Link function: Stop the Current Playback and Start Playback from a Specified Play List, Cell or Time
    Format: Link (PL #, Cell #, time)
    where PL # stands for a play list name,
    Cell # stands for a cell number, and
    Time stands for a playback start time within the cell (b) PNG Drawing Function: Draw Specified PNG Data on an Image Plane
    Format: Draw (File, X, Y)
    where File stands for a PNG file name,
    X represents an X coordinate, and
    Y represents a Y coordinate.

(c) Image Plane Clear Function: Clear the Specified Range on the Image Plane
    Format: Clear (X, Y, W, H)
    where X represents an X coordinate,
    Y represents a Y coordinate,
    W represents the width in the X direction, and
    H represents the width in the Y direction The player variables include system parameters SPRM representing a condition of the player and general parameters GPRM, which can be used for general purposes.

FIG. 24 is a list of the system parameters SPRM:
    SPRM (0): language code
    SPRM (1): audio stream number SPRM (2): subtitle stream number
SPRM (3): angle number
SPRM (4): title number
SPRM (5): chapter number
SPRM (6): program number
SPRM (7): cell number
SPRM (8): key name
SPRM (9): navigation timer
SPRM (10): current playback time
SPRM (11): player audio mixing mode for Karaoke
SPRM (12): country code for parental management
SPRM (13): parental level
SPRM (14): player configuration for video
SPRM (15): player configuration for audio
SPRM (16): language code for AST
SPRM (17): language code ext. for AST
SPRM (18): language code for STST
SPRM (19): language code ext. for STST
SPRM (20): player region code
SPRM (21): reserved
SPRM (22): reserved
SPRM (23): player status
SPRM (24): reserved
SPRM (25): reserved
SPRM (26): reserved
SPRM (27): reserved
SPRM (28): reserved
SPRM (29): reserved
SPRM (30): reserved
SPRM (31): reserved In this preferred embodiment, the programming function of the virtual player is supposed to be based on Java® Script. Alternatively, any other programming function such as B-Shell or Perl Script used in UNIX® OS, for example, may be used, too. In other words, the present invention is never limited to Java® Script.

(10) Exemplary Programs

Exemplary programs for the event handler will be described with reference to FIGS. 25 and 26.

Figure 25:
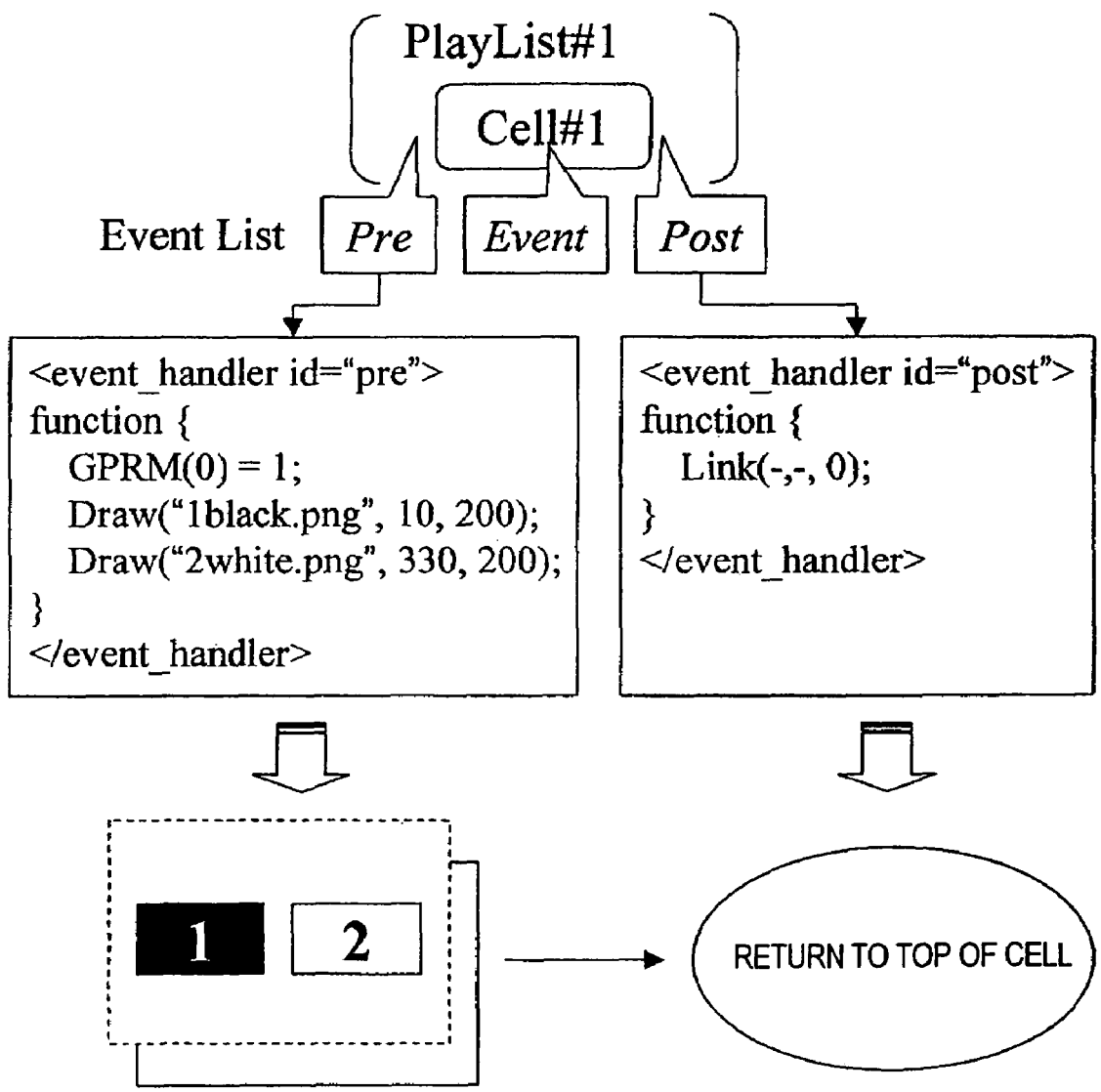
FIG. 25 shows an exemplary program for a menu that has two selection buttons.

FIG. 25 shows an exemplary program for a menu that has two selection buttons.

At the beginning of the cell (PlayList #1. Cell #1), the program starting with <event_handler ID="pre">shown in FIG. 25 is executed by using a time event. In this case, GPRM (0), which is one of general parameters, is set equal to "1" first. GPRM (0) is used to identify the button being selected in the program. In the beginning, a state in which the left-hand side button 1 is selected is defined as an initial value. Next, PNG images are drawn for the buttons 1 and 2, respectively, by using a drawing function Draw. Specifically, as for the button 1, a PNG image "1black.png" is drawn from a point with coordinates (10, 200) as a start point (i.e., the left corner). On the other hand, as for the button 2, a PNG image 2white.p-ngw is drawn from a point with coordinates (330, 200) as a start point (i.e., the left corner).

Also, at the end of this cell, the program on the right-hand side of FIG. 25 is executed by using a time event. In this case, it is instructed that the cell be played back all over again from the beginning by using a Link function.

Figure 26:
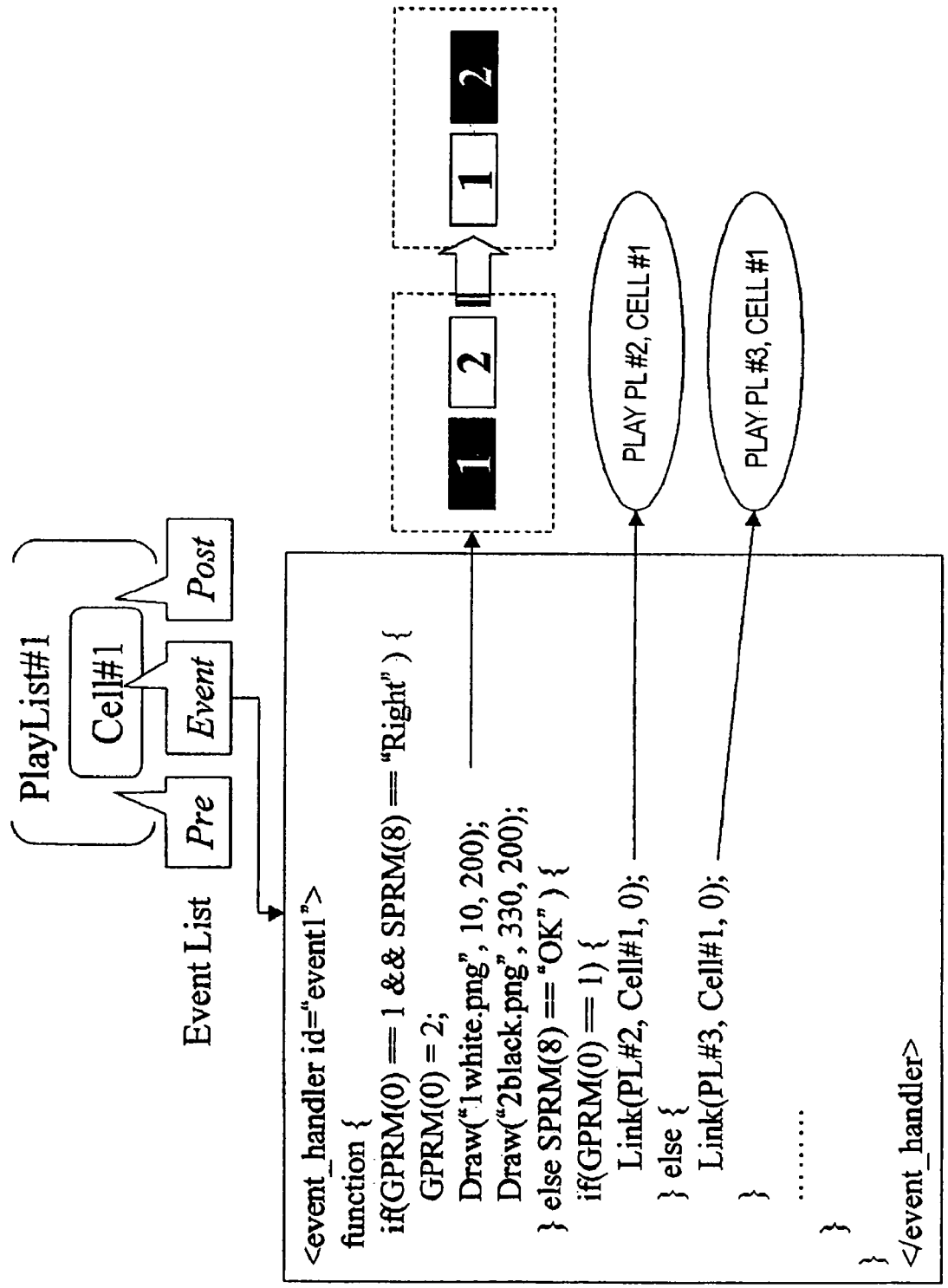
FIG. 26 shows an exemplary program for an event handler to process the user event of "menu selection".

FIG. 26 shows an exemplary program for an event handler to process the user event of "menu selection".

The event handler describes the program so as to tell what to do if any of the remote controller keys "left", "right" and "enter" has been pressed down. If the user has pressed down one of those remote controller keys, then the user event is generated as already described with reference to FIG. 21 to activate the event handler shown in FIG. 26. This event handler carries out branch processing based on the value of GPRM (0) that identifies the selected button and SPRM (8) that identifies the selected remote controller key. The branch and execute processing is carried out as follows depending on the conditions:

Condition 1): If the button 1 is currently selected and if the selected key is the "right" key, then GPRM (0) is modified into "2", the button being selected is changed into the right-hand side button 2 and the images of the buttons 1 and 2 are rewritten;

Condition 2): If the selected key is the "enter (OK)" and if the button 1 is currently selected, then the play list #2 starts being played back; and Condition 3): If the selected key is the "enter (OK)" and if the button 2 is currently selected, then the play list #3 starts being played back.

(11) Processing Flow of the Virtual Player

Figure 27:
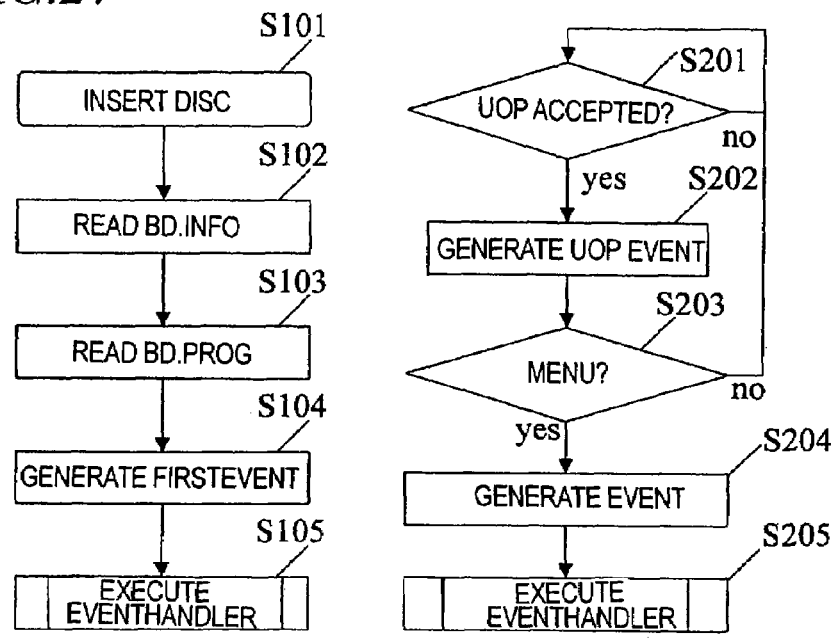
FIG. 27 shows the flow of the basic processing to be done before AV data is played back.

Next, the flow of the processing to be done by the player will be described with reference to FIGS. 27 through 30. FIG. 27 shows the flow of the basic processing to be done before AV data is played back.

When a BD is inserted (S101), the BD player reads and analyzes a BD.INFO file (S102) and then reads BD.PROG (S103). Both BD.INFO and BD.PROG are temporarily stored in a management information storage memory and are analyzed by a scenario processor.

Subsequently, in accordance with the first event information FirstEvent in the BD.INFO file, the scenario processor generates the first event (S104). The first event generated is received by a program processor, which executes an event handler corresponding to the event (S105).

The event handler corresponding to the first event is expected to contain information about the play list to play back first. If the playback of no play lists (i.e., PL playback) were instructed, then the player would just wait to accept a user event (S201) without playing back anything. On receiving a user's command through the remote controller, the BD player makes an UOP manager issue a UOP event to the program manager (S202).

The program manager determines whether or not the UOP event is a menu key (S203). If the answer is YES, the program manager supplies the UOP event to the scenario processor, thereby making the scenario processor generate a user event (S204). Then, the program processor executes an event handler corresponding to the user event generated (S205).

Figure 28:
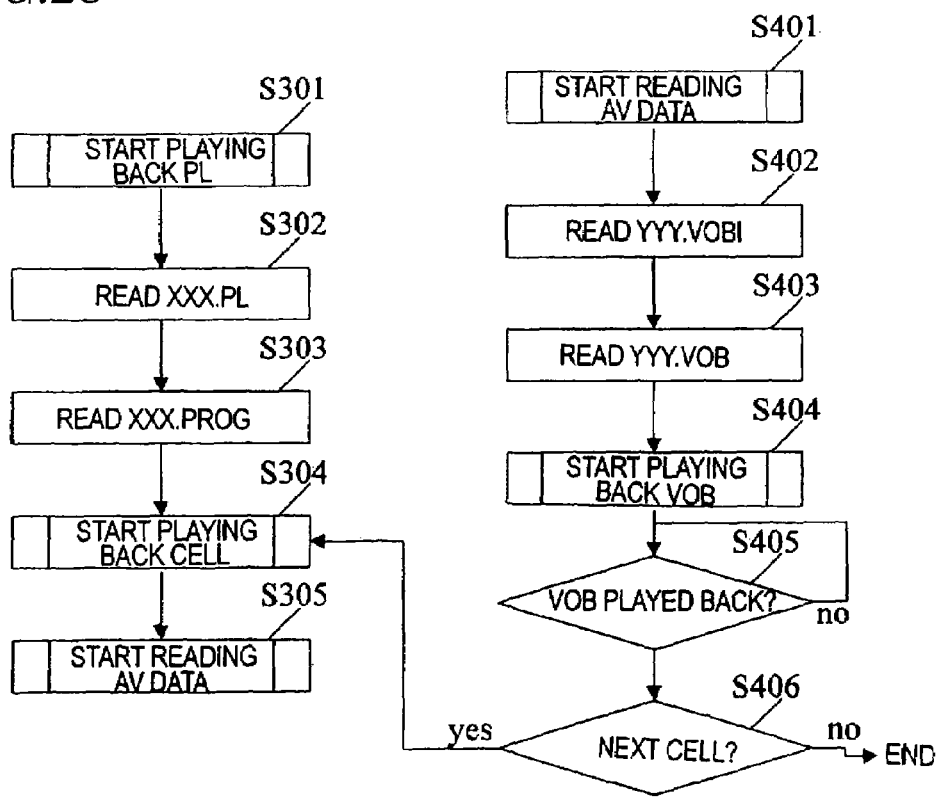
FIG. 28 shows the flow of processing to be done since the playback of a play list is started and until the playback of a VOB is started.

FIG. 28 shows the flow of processing to be done since the playback of the play list is started and until the playback of a VOB is started.

As described above, either the first event handler or the global event handler starts playing back the play list (S301). To collect information needed to play back the target play list, the scenario processor reads and analyzes the play list information XXX.PL (S302) and then reads program information XXX.PROG associated with the play list (S303). Subsequently, the scenario processor instructs playing back a cell in accordance with the information about the cells registered with the play list (S304). To play back a cell means that the scenario processor sends a command to the presentation controller. Thus, the presentation controller starts playing back the AV data (S305).

When the playback of the AV data is started (S401), the presentation controller reads and analyzes a VOB information file XXX.VOBI associated with the cell to play back (S402). By using the time map, the presentation controller specifies the VOB to start playback at and its address and tells the drive controller a readout address. In response, the drive controller reads the target VOB data (S403). Then, the VOB data is supplied to the decoder and starts being read (S404).

The VOB is continuously played back until its playback interval ends (S405). When the playback finishes, the next cell starts being played back (S304). If there is no next cell anymore, then the playback operation ends (S406).

Figure 29:
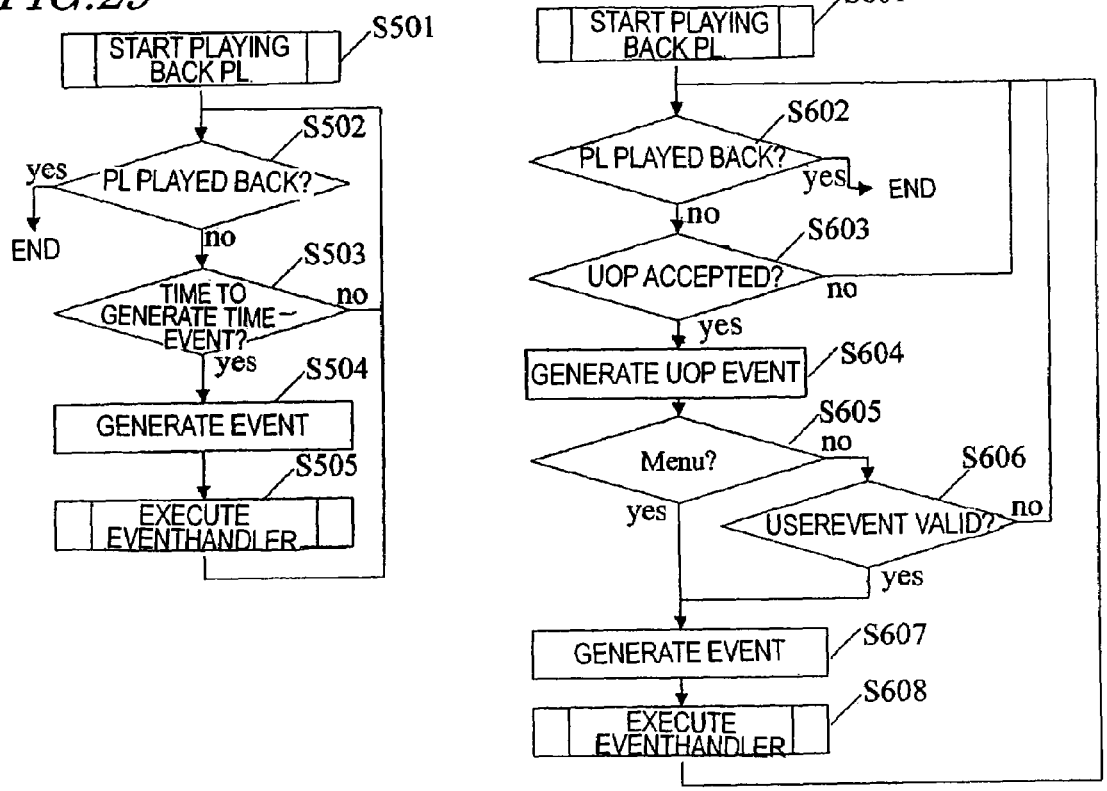
FIG. 29 shows the flow of event handling to be done after the AV data started being read.

FIG. 29 shows the flow of event handling to be done after the AV data started being read. The BD player is an event driven type. When the play list starts being played back, event handling processes, including time event, user event and subtitle display lines, are started up. And these three lines of event handling processes are carried out in parallel with each other.

The processing steps S501 through S505 show the flow of the "time event" line of processing. After the play list started being played back (S501), it is determined whether or not the play list has been played back completely (S502). Then, the scenario processor sees if it is the time to generate a time event (S503). If the answer is YES, the scenario processor generates the time event (S504). Then, the program processor receives the time event and executes the event handler (S505).

If the answer to the query of Step S503 is NO (i.e., if it is not yet the time to generate the time event) or after the event handler has been executed in Step S504, the process returns to Step S502 and the same processing is repeatedly performed all over again. On the other hand, if it is confirmed in Step S502 that the play list has been played back fully, the time event line of processing is brought to a forced end.

The processing steps S601 through S608 show the flow of the "user event" line of processing. After the play list started being played back (S601), it is determined whether or not the play list has been played back completely (S602). Then, the process advances to the step of seeing if an UOP has been accepted (S603). If an UOP has been accepted, then the UOP manager generates a UOP event (S604). Next, the program processor, having received the UOP event, checks whether the UOP event is a menu call or not (S605). If the answer is YES, then the program processor makes the scenario processor generate an event (S607). And the program processor executes the event handler (S608).

On the other hand, if it is determined in Step S605 that the UOP event is not a menu call, then the UOP event should be an event specified by either a cursor key or the "enter" key. In that case, the scenario processor determines whether or not the current time falls within the duration of the user event (S606). If the answer is YES, then the scenario processor generates the user event (S607) and the program processor executes the event handler in question (S608).

If the answer to the query of Step S603 is NO (i.e., if no UOP has been accepted) or if the answer to the query of Step S606 is NO (i.e., if the current time falls out of the user event duration) or after the event handler has been executed in Step S608, the process returns to Step S602 and the same processing is repeatedly performed all over again. On the other hand, if it is confirmed in Step S602 that the play list has been played back fully, the user event line of processing is brought to a forced end.

Figure 30:
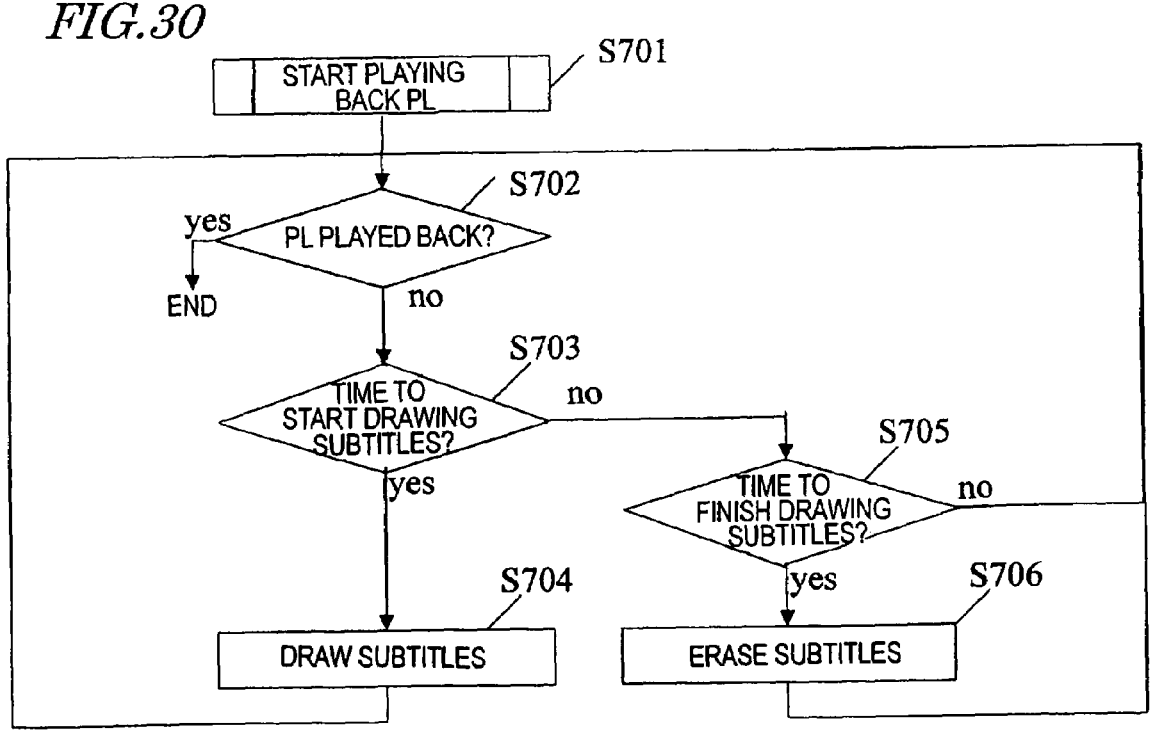
FIG. 30 shows the flow of subtitle processing.

FIG. 30 shows the flow of subtitle processing. After the play list started being played back (S701), it is determined whether or not the play list has been played back completely (S702). Then, the process advances to the step of seeing if it is the time to start drawing the subtitle (S703). If the answer is YES, then the scenario processor instructs the presentation controller to draw the subtitle, and the presentation controller, in turn, instructs the image processor to draw the subtitle (S704). On the other hand, if the answer to the query of Step S703 is NO, then it is determined whether or not it is the time to finish drawing the subtitle (S705). If the answer is YES, then the presentation controller instructs the image processor to erase the subtitle, thereby erasing the subtitle being drawn from the image plane (S706).

After the subtitle drawing has been instructed in Step S704 or after the subtitle erasure has been instructed in Step S706 or if the answer to the query of Step S705 is NO (i.e., if it is not yet the time to finish drawing the subtitle), the process returns to Step S702 and the same processing is repeatedly performed all over again. On the other hand, if it is confirmed in Step S702 that the play list has been played back fully, the processing is brought to a forced end.

Figure 31:
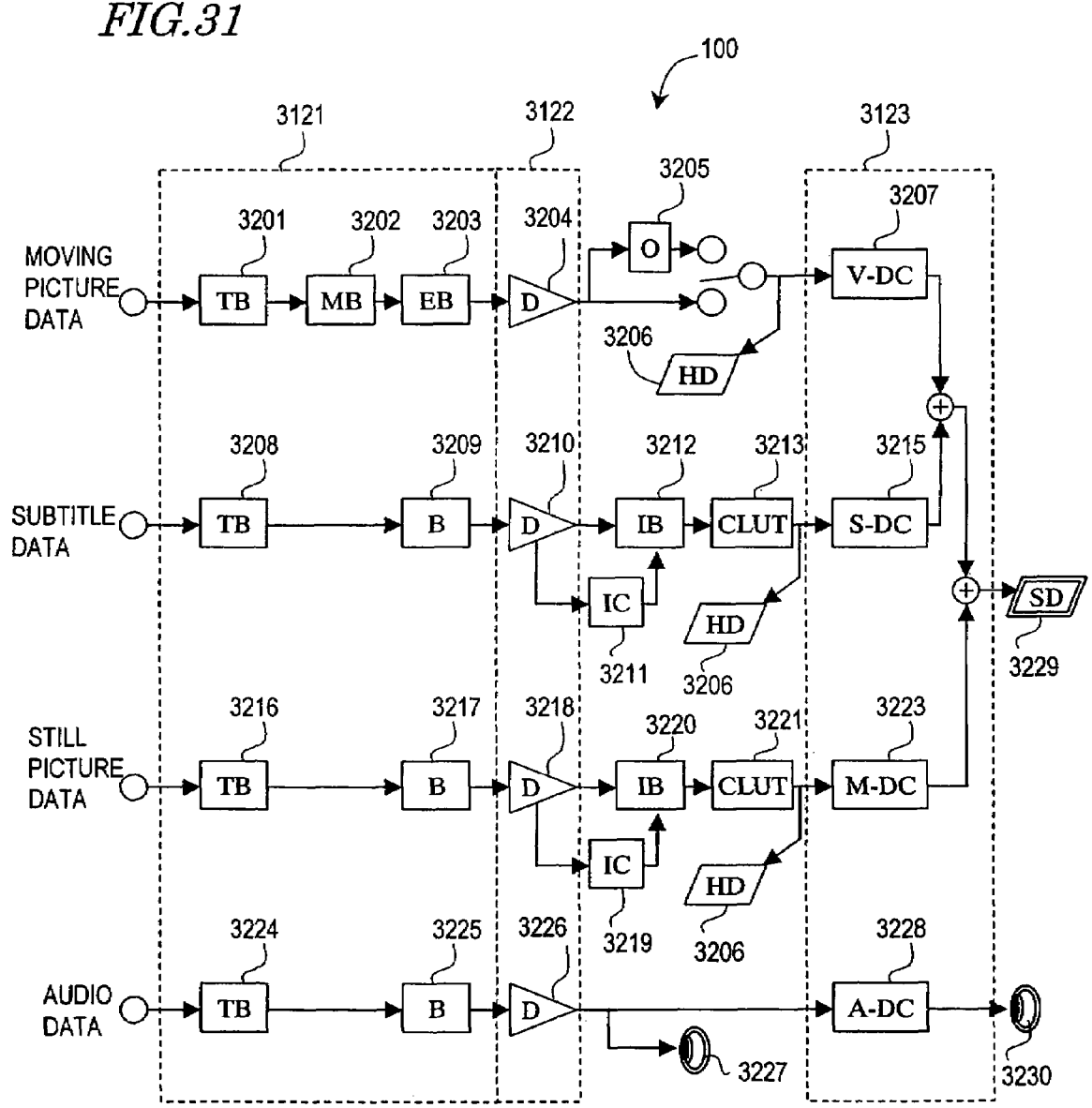
FIG. 31 shows a configuration for a player 100 for performing down conversion processing according to this preferred embodiment.

(12) Player Performing Down Conversion Processing FIG. 31 shows a configuration for a player 100 for performing down conversion processing according to this preferred embodiment. The player 100 is constructed based on a transport stream related system target decoder (T-STD) model according to an MPEG standard. The player 100 can downconvert HD video into SD video.

Figure 3:
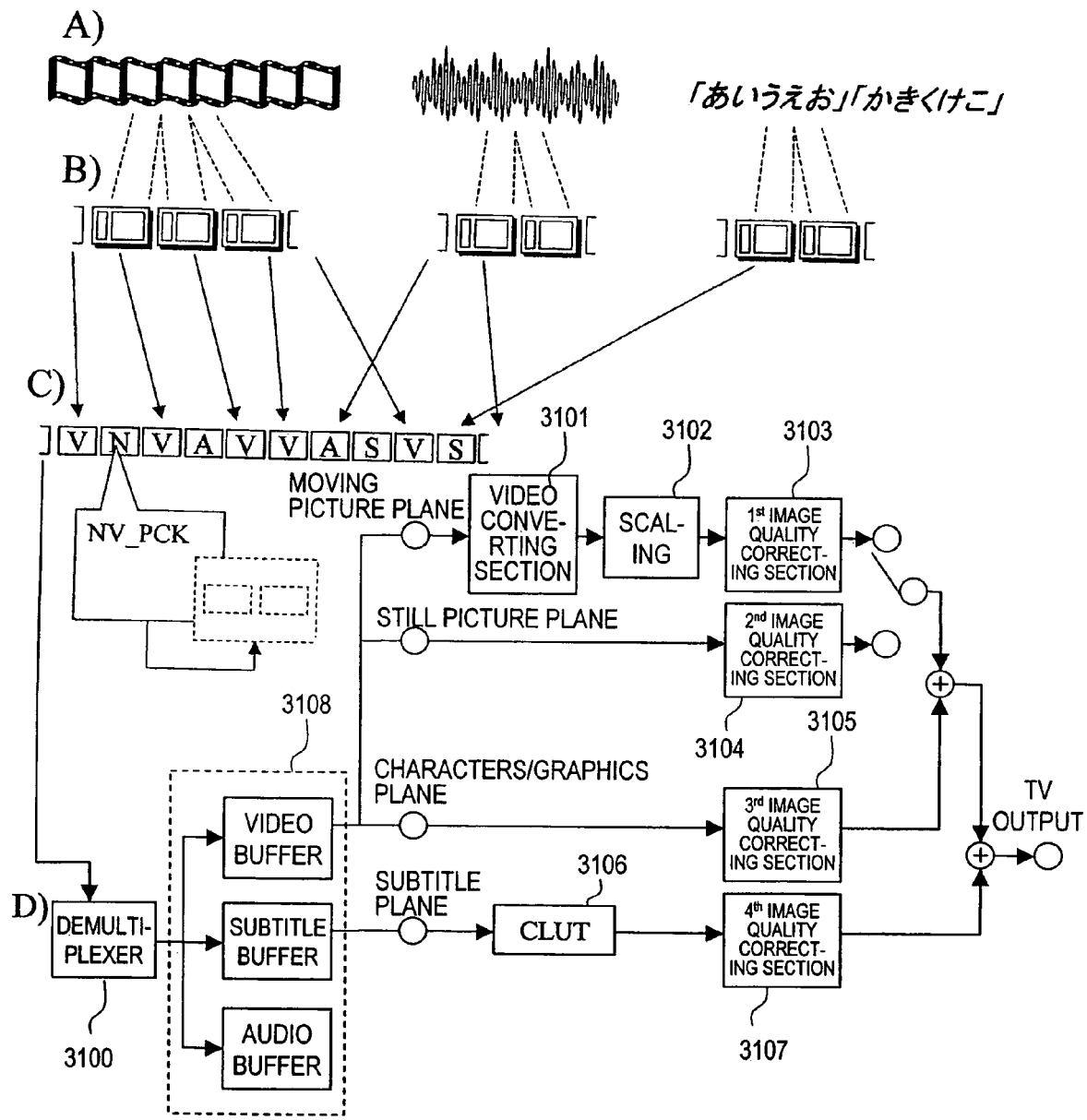
FIGS. 3A, 3B and 3C show how to generate a VOG
FIG. 3D shows a configuration for a player for playing back the VOG generated.

In FIG. 31, moving picture data, subtitle data, still picture data and audio data are separately input to this decoder model. These data are obtained after an MPEG transport stream has been read by an optical head from a BD, received by a demultiplexer, divided into packets storing the moving picture data, subtitle data and so on, and output. The demultiplexer may have the same functions as the demultiplexer 3100 shown in FIG. 3, for example.

The player 100 may be roughly grouped into a buffer 3121, a decoder 3122, a signal processing system for respective data types, and a converting section 3123.

The buffer 3121 includes a plurality of buffers for storing each of the moving picture data, subtitle data, still picture data and audio data on multiple stages. The decoder 3122 decodes the video and audio data, which has been compression-coded so as to comply with an MPEG standard, in compliance with the same MPEG standard. The signal processing system performs a different type of processing according to the specific type of the given data such as the moving picture data. This system will be described in further detail later. The converting section 3123 down-converts HD video into SD video. The buffer 3121, decoder 3122 and signal processing system may be implemented as a single decoder chip. Alternatively, only the decoder 3122 and signal processing system may be implemented as a single chip.

Hereinafter, the functions of the respective components, as well as the processing flow of the moving picture data, subtitle data and still picture data, which are all included in the video data, will be described.

First, the moving picture data is transferred to a video decoder line, passed through a transport buffer (TB) 3201 and multiplexing buffer (MB) 3202 and then temporarily stored in an elementary buffer (EB) 3203. The pictures, which have been stored in the EB 3203, are transferred to, and decoded by, a video decoder 3204 when the time specified by the decoding time stamp DTS has come. Among these pictures, I- and P-pictures to be referred to by other pictures are transferred to a reorder buffer 3205 and used for decoding the other pictures. Each of these pictures is sent to, and presented by, an image display device at a time defined by its presentation time stamp PTS. If an HDTV is connected, the HD video decoded is output to the HDTV 3206 at the PTS time. If down conversion is needed to present it on an SDTV, then the HD video decoded is transferred to, and converted into SD video by, a video down converter (V-DC) 3207.

The subtitle data is transferred through a transport buffer (TB) 3208 to a buffer (B) 3209 and temporarily stored there. And as in the video, at the time specified by the decoding time stamp DTS, the subtitle data is also transferred to, and decoded by, the subtitle decoder (D) 3210 instantaneously. The subtitle data decoded is once expanded on an image buffer (IB) 3212 and a specified subtitle is output to an HDTV by way of a color conversion table (CLUT) 3213 at the PTS time in response to a request from an image controller IC 3211. The subtitle is presented on an HDTV display area that has been specified by the image controller IC 3211. If down conversion is needed to present it on an SDTV, then the HD grade subtitle decoded is transferred to, and converted into SD grade subtitle by, a subtitle down converter (S-DC) 3215.

The still picture data, representing a still picture such as a menu, is also decoded and output to an HDTV or an SDTV. The still picture data is processed similarly to the subtitle data. Since the statement about the subtitle data also applies to the still picture data, the description thereof will be omitted herein.

The down-converted moving picture data, subtitle data and still picture data are synthesized together to produce SD video to be output to an SDTV 3229. First, the moving picture and subtitle are α-blended (i.e., synthesized) together. An SD grade moving picture, obtained as a result of the synthesis, is further α-blended (synthesized) with a still picture such as a menu. In this manner, SD video, in which the subtitle is superimposed on the background image and in which the still picture such as a menu is further superposed on the subtitle, is completed. The SD video is output to the SDTV 3229.

The audio data is processed in the following flow. Specifically, the audio data is transferred through a transport buffer (TB) 3224 to, and temporarily stored in, a buffer (B) 3225. Thereafter, at the time specified by the decoding time stamp DTS, the audio data is instantaneously output to, and decoded by, an audio decoder 3226. It should be noted that the decoding time of the audio data is often identical with the presentation time. That is to say, in almost every sound, its decoding time stamp DTS is its presentation time stamp PTS. . Accordingly, after having been decoded, the sound is output to a loudspeaker 3227 immediately.

If no HDTV is connected to the video output and if the HD video needs to be down-converted into SD video, then the audio data is transferred to an audio down converter (A-DC) 3228 and subjected to sampling and other decimation processing there. As a result, sound is output through a loudspeaker 3230 synchronously with the SD video. The audio down converter (A-DC) 3228 is provided for the following reason. Specifically, SD video, which has been subjected to a down conversion such as DEFT conversion complying with the PAL standard (to be described later), may be presented at a different rate than its original HD video. Thus, to adjust the playback rates, the audio down conversion is sometimes needed such that the resultant sound matches the SD video.

It should be noted that if the playback rate of the down-converted SD video is different from that of the original HD video, then it is not always necessary to decode it precisely as specified by the decoding time stamp DTS as will be described later.

Next, the process of down-converting HD video into SD video will be described in detail with reference to FIGS. 32 and 33. In this example, the HD video is supposed to be progressive scanned film material video (i.e., moving pictures with subtitles) with a frame rate of 24 Hz. On the other hand, the SD video is supposed to be either interlaced scanned NTSC video with a frame rate of 59.94 Hz or interlaced scanned PAL video with a frame rate of 50 Hz. In any case, since the original HD video is moving pictures with subtitles, the down-converted video is also supposed to be moving pictures with subtitles.

Figure 32:
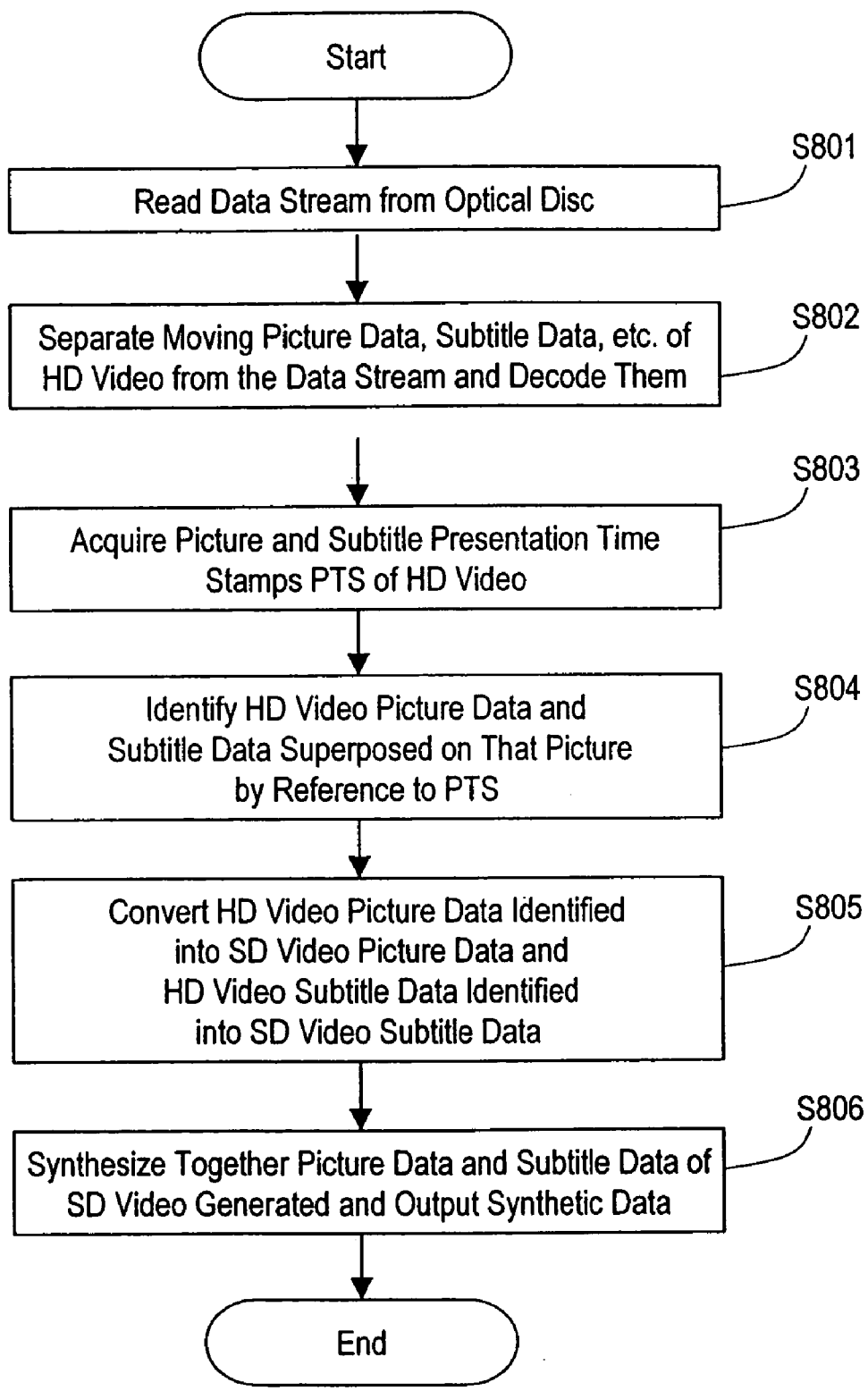
FIG. 32 shows the procedure of the down conversion processing.

FIG. 32 shows the procedure of the down conversion processing. First, the player 100 reads an MPEG data stream from an optical disc (S801). The demultiplexer (not shown) receives the MPEG data stream, separates it into moving picture data, subtitle data, still picture data and audio data, and then sends these data to the decoder 3122 by way of the buffer 3121. In response, the decoder 3122 decodes the moving picture data, subtitle data, still picture and so on of the HD video (S802).

Next, the converting section 3123 acquires the presentation time stamp PTS of the HD video (S803). More specifically, the video down converter 3207 acquires the PTS of the moving pictures and the subtitle down converter 3215 acquires the PTS of the subtitles. As already described with reference to FIG. 10, the presentation time stamp PTS is obtained from the packet header of one of the packets that make up the MPEG data stream.

Subsequently, the converting section 3123 identifies the moving picture data and the data of the subtitle to be presented on that picture by reference to the PTS (S804), and converts the HD video picture data identified into SD video picture data and the HD video subtitle data identified into SD video subtitle data, respectively (S805).

Hereinafter, the processing to be carried out in Steps S804 and S805 will be described in further detail with reference to FIG. 33. FIG. 33 shows correlations between pictures of respective grades when pictures of the HD video (i.e., film material video) are converted into pictures of the SD video (i.e., video complying with the NTSC or PAL standard). The film material HD video, extracted from an MPEG data stream, is obtained by switching pictures P1, P2 and so on, which are progressive scan signals with a playback period of ¹⁄₂₄ second, one after another such that those pictures are presented continuously.

The converting section 3123 converts this HD video into SD video. The converted SD video (complying with the NTSC standard) has a playback period of 1/59.94 second and is obtained by switching fields, which are interlaced scan signals, one after another such that those fields are presented continuously. Meanwhile, the converted SD video (complying with the PAL standard) has a playback period of ¹⁄₅₀ second and is obtained by switching fields, which are interlaced scan signals, one after another such that those fields are presented continuously.

In converting the HD video into the NTSC-compliant SD video, the conversion is done on the following rule. Specifically, a frame P1 of the film material is converted into two fields P1t and P1b and a frame P2 of the film material is converted into three fields P2t, P2b and P2t. Speaking more generally, an odd-numbered HD video picture is converted into two SD video fields, while an even-numbered HD video picture is converted into three SD video fields. This conversion is called "2:3 pull down" and is a technique of converting two frames of HD video into five fields of SD video. In the converted NTSC-compliant SD video, however, the field P2t, for example, is displayed twice with the field P2b interposed, and therefore, the video looks blurred.

In converting HD video into PAL-compliant SD video, a technique called "DEFT conversion" may be used. In the DEFT conversion, a frame Pn of the film material is converted into two fields Pnt and Pnb. Thus, unlike the NTSC-compliant video, the same field is never presented twice, and video blurring can be minimized. On the other hand, each field is presented at 50 Hz (i.e., each frame is presented at 25 Hz). That is to say, the 24 Hz HD video is converted into 25 Hz SD video. Thus, compared with the original HD video, the SD video is presented 1 Hz faster per frame (i.e., two fields).

As described above, if the HD video with a frame rate of 24 Hz (or 23.976 Hz) such as a film material is down-converted into SD video, then each picture is presented at a different timing from the original timing defined by 24 Hz. Accordingly, in a situation where subtitles need to be superimposed on moving pictures, it must be carefully determined on what pictures the subtitles should be superimposed.

In superimposing the subtitles on both a moving picture and a still picture, the presentation time stamps PTS may be provided separately for the moving picture and still picture. However, the SDTV has a presentation time grid (of 59.94 Hz or 50 Hz) for each picture. For that reason, the output time on the SDTV is preferably matched to this grid.

First, according to the MPEG-2, the DTS and PTS of each access unit can be set at a time accuracy of 90,000 Hz. Accordingly, as for the 24 Hz film material, the difference in PTS between two adjacent moving pictures that should be presented back to back is 3,750. As for the NTSC on the other hand, the PTS difference between two fields of a moving picture is either 1,501 or 1,502. And in the PAL, the PTS difference between two fields is 1,800. In each presentation format, the PTS of every picture needs to comply with associated one of these grids.

When multiplexed according to the MPEG-2, the subtitle data can also have its presentation time stamp PTS set at a time accuracy of 90,000 Hz. However, the subtitle data should not be defined at an arbitrary point in time. On an SD video picture obtained from its associated HD video picture, a subtitle, having the same contents as the counterpart on the HD video picture, needs to be always presented. For example, if the data is simultaneously output to an HDTV and to an SDTV, then the same scene of a moving picture being presented on the HDTV and SDTV should not have different subtitles.

In FIG. 33, the pictures P4, P5 and P6 illustrated as solid black bars are supposed to have subtitles. To present the same subtitles even on the SD video versions of these pictures P4, P5 and P6, the converting section 3123 identifies the picture data of a moving picture and the subtitle data to be superimposed on that picture by reference to the PTS of the moving picture and the PTS of the subtitle (i.e., Step S804 shown in FIG. 32).

Specifically, supposing the PTS of the pictures P4, P5 and P6 are identified by t4, t5 and t6 (where t5=t4+3750 and t6=t5+3750), respectively, subtitles, of which the PTS are also t4, t5 and t6, are identified. Then, the data of the pictures P4, P5 and P6 of the identified HD video is converted into SD video picture data, and the subtitle data of the identified HD video is converted into subtitle data of SD video (i.e., Step S805 shown in FIG. 32). Then, the converting section 3123 synthesizes together the picture data and subtitle data of the SD video generated and outputs the synthetic data (S806).

As a result, in the SD video obtained by this conversion, subtitles having the same contents as the subtitles with the PTS value of t4 are presented in SD grade on the fields P4b, P4t and P4b corresponding to the picture P4. On the other hand, subtitles having the same contents as the subtitles with the PTS value of t5 are presented in SD grade on the fields P5t and P5b corresponding to the picture P5. The same statement as that applied to the picture P4 also applies to the picture P6. Accordingly, even after the film material has been converted into an NTSC- or PAL-compliant picture, the correlation between the subtitles and the moving pictures on which the subtitles are superimposed is maintained. The same statement applies to the PAL pictures, too.

However, according to the DEFT conversion applied to the PAL picture, frames are updated at a higher rate than the original frame display rate (i.e., the vertical scanning frequency) of the film material. Accordingly, the sound to be synchronized with those frames needs to be reproduced at an increased rate and has to have a higher pitch, which is a problem. In that case, such an inconvenience can be eliminated by the following method.

FIG. 34 shows correlations between the pictures in a situation where pictures of HD video (i.e., film material video) are converted into pictures of SD video. In this example, the processing of converting the pictures of the HD video (film material video) shown on the first row of FIG. 34 into the pictures of the SD video shown on the third row will be described. It should be noted that the second row of FIG. 34 shows DEFT-converted PAL-compliant pictures as in the third row of FIG. 33. These pictures also are shown in FIG. 34 so as to be easily compared with the converted pictures shown on the third row of FIG. 34.

As described above, if the 24 Hz HD video is converted into the 25 Hz PAL-compliant SD video by the DEFT conversion technique, then the resultant SD video is presented faster than the HD video by one frame per second. Thus, in this preferred embodiment, although the DEFT conversion is carried out most of the time, a particular picture (i.e., a field or a frame) is displayed a number of times at regular intervals during the conversion, thereby adjusting the number of pictures to be presented per second and eventually preventing the video presentation rate from becoming too high. This conversion will be referred to herein as a "field doubling conversion".

Hereinafter, it will be described with reference to FIG. 34. In FIG. 34, fields obtained by subjecting a picture P5 of the HD video to the DEFT conversion are identified by P5t and P5b, and fields resulting from another picture P6 of the HD video are identified by P6t and P6b. In the field doubling conversion, the video is converted such that after the fields P5t and P5b have been presented, the field P5t is presented again. When the field P5t has been presented for the second time, the field P6b and then the field P6t are presented in this order. By presenting the field P5t twice, the presentation time of the next field P6b is delayed by 1/50 second. As a result, the fast forwarding can be reduced by one field. This processing is similarly applicable to not just a moving picture but also a subtitle and other video to be presented synchronously with that moving picture. As to the subtitle data, for example, the subtitle converter 3215 shown in FIG. 31 may perform the conversion such that a subtitle field to be presented with the field P5b is followed by a subtitle field to be presented with the field P5t and then a subtitle field is presented synchronously with the field P6b.

Furthermore, if another field is presented twice and if two particular fields are presented twice a second, then a picture consisting of two fields immediately after them can have its presentation timing matched with that of its associated picture of the film material. According to the field doubling conversion, the same field is presented a number of times, and therefore, the SD video might look blurred when the field is presented for the second time. However, since the presentation timing of a picture can be matched with that of HD video, the audio data to be reproduced synchronously with that picture can be reproduced as it is without any distortion. Accordingly, if a content, which is a film material (i.e., with a rate of 24 Hz or 23.976 Hz) and in which the sound plays an important role, is down-converted into a PAL-compliant picture, this field doubling down conversion processing is preferred.

As can be seen from FIG. 31, the player 100 down-converts the HD grade moving picture data, subtitle data and still picture data independently of each other, thereby generating respective types of data of the SD grade. Thereafter, the player 100 synthesizes them together to obtain SD video. Alternatively, the player 100 may synthesize together HD grade moving picture data, subtitle data and still picture data and then down-convert the synthesized HD video into SD video to generate SD synthetic video. To carry out such processing, the converting section 3123 shown in FIG. 31 needs to be provided with a component for synthesizing together the HD grade moving picture data, subtitle data and so on and a down converter for converting the HD synthetic video output of that component into SD video.

Figure 35:
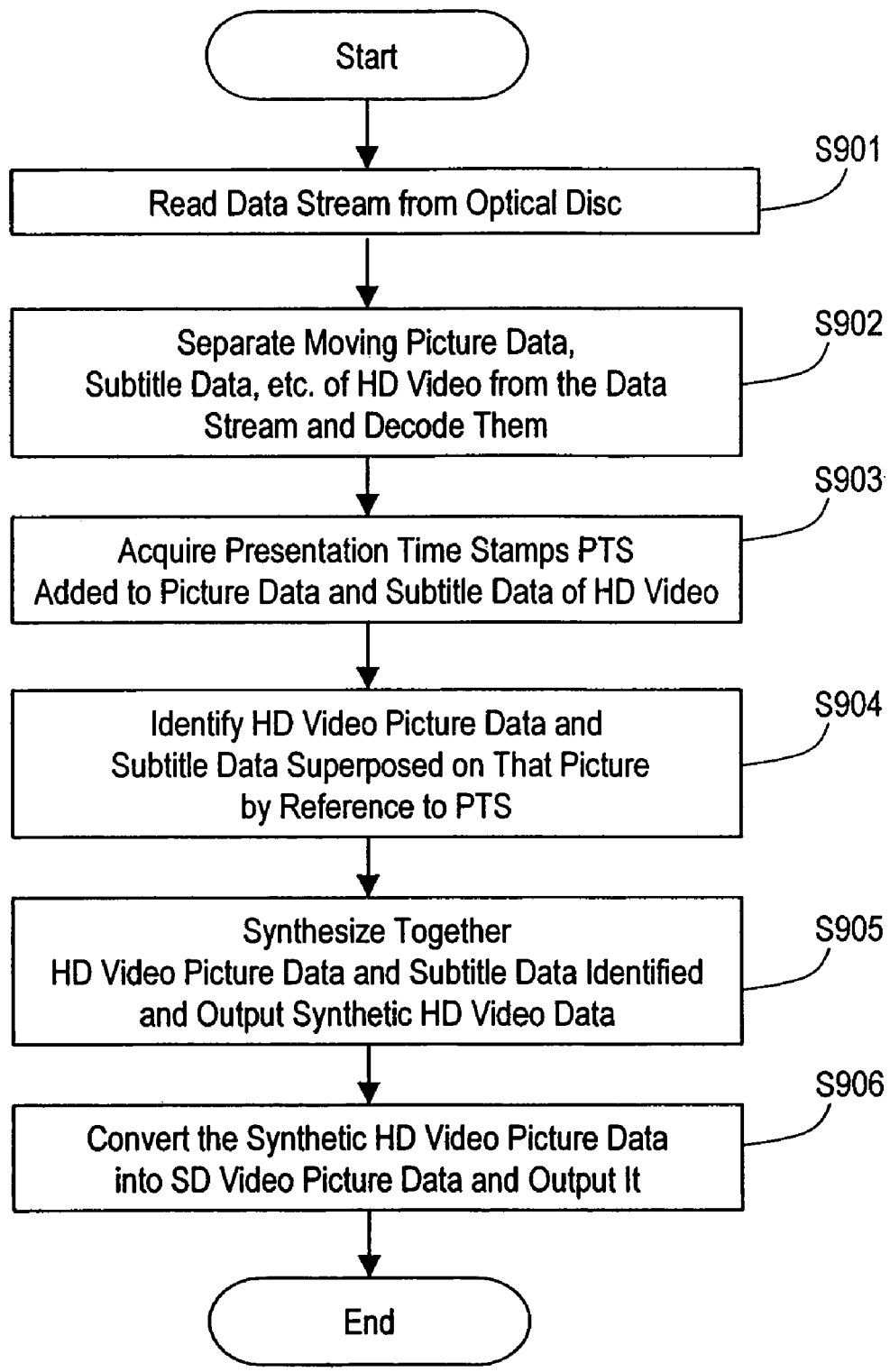
FIG. 35 shows the procedure of second exemplary down conversion processing.

FIG. 35 shows the procedure of second exemplary down conversion processing. This processing may be carried out in place of the processing shown in FIG. 32. Although the configuration of a system for executing this processing is not shown, the system may be made up of the same components as those of the player 100 shown in FIG. 31 except for the internal configuration of the converting section 3123. Thus, the following example will also be described with reference to the player 100 shown in FIG. 31.

First, the player 100 reads an MPEG data stream from an optical disc (S901). The demultiplexer (not shown) receives the MPEG data stream, separates it into moving picture data, subtitle data, still picture data and audio data, and then sends these data to the decoder 3122 by way of the buffer 3121. In response, the decoder 3122 decodes the moving picture data, subtitle data, still picture and so on of the HD video (S902).

Next, the converting section 3123 acquires the picture data of the HD video and the presentation time stamp PTS added to the subtitle data (S903). Then, the converting section 3123 identifies the picture data of the HD video and the data of the subtitle to be superimposed on that picture by reference to the PTS (S904).

Thereafter, the converting section 3123 synthesizes the identified picture data and subtitle data of the HD video together, thereby generating synthetic HD video data (S905). Subsequently, the converting section 3123 converts the picture data of the synthetic HD video into picture data of SD video and outputs it (S906).

The processing of generating the synthetic HD video and then converting it into SD video may be carried out by one of the conversion methods that have been described with reference to FIGS. 33 and 34. For example, the HD video may be converted into NTSC-compliant SD video by the 2:3 pull down conversion technique or into PAL-compliant SD video by either the DEFT conversion technique or the field doubling conversion technique. Also, if it is expected that the video being down-converted will be panned and scanned on a TV set with an aspect ratio of 4 to 3, then the conversion may be carried out such that the subtitle display area (or its width among other things) will not exceed the 4 to 3 TV screen after the down conversion.

On whether the DEFT conversion or the field doubling conversion is to adopt, the viewer may instruct the player 100 every time the conversion needs to be carried out or one of these two techniques may be selected in advance.

Alternatively, conversion designating information, describing a recommended conversion method, may be added to the stream and the player 100 may pick a conversion method in accordance with that conversion designating information.

Figure 36:
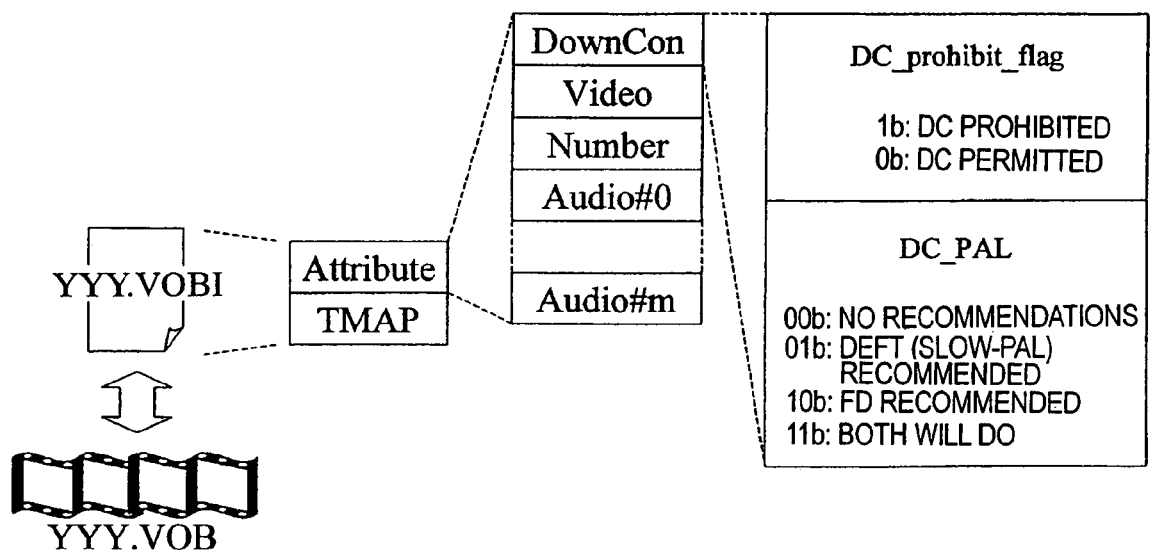
FIG. 36 shows the data structure of conversion designating information that describes a recommended conversion method.

FIG. 36 shows the data structure of the conversion designating information that describes a recommended conversion method. The conversion designating information may be described in the BD management information YYY.VOBI and/or in YYY.VOB of an MPEG stream, for example. If that information is described in the stream management information YYY.VOBI, then appropriate down conversion processing may be selected on a VOB basis. As another alternative, that information may also be stored in a separate area on the disc (e.g., BD.INFO). In this description, a broadcaster on the transmitting end is supposed to transmit an MPEG transport stream with the conversion designating information described therein as a matter of principle. If necessary, however, the recorder may describe the conversion designating information in the management information YYY.VOBI accompanying an MPEG transport stream during a writing operation.

More specifically, the conversion designating information is defined by the down conversion information DownCon within the attribute information Attribute. The down conversion information includes a flag DC_prohibit_flag and information DC_PAL designating a recommended conversion method.

The flag DC_prohibit_flag shows whether or not this content may be down-converted so as to output SD video. If the down conversion is prohibited, then "1b" is added to the flag. On the other hand, if the down conversion is permitted, then "0b" is added to the flag. The information DC_PAL designating a recommended conversion method shows how to carry out a down conversion into PAL-compliant SD video and designates a conversion method. In this preferred embodiment, "00b" is added to DC_PAL if there is no recommended conversion method, "01b" is added to DC_PAL if the DEFT conversion is recommended, and "10b" is added to DC_PAL if the field doubling (FD) conversion is recommended as shown in FIG. 36. If no conversion method is particularly recommended, then "11b" is added thereto to indicate that either conversion method will do.

Figure 37:
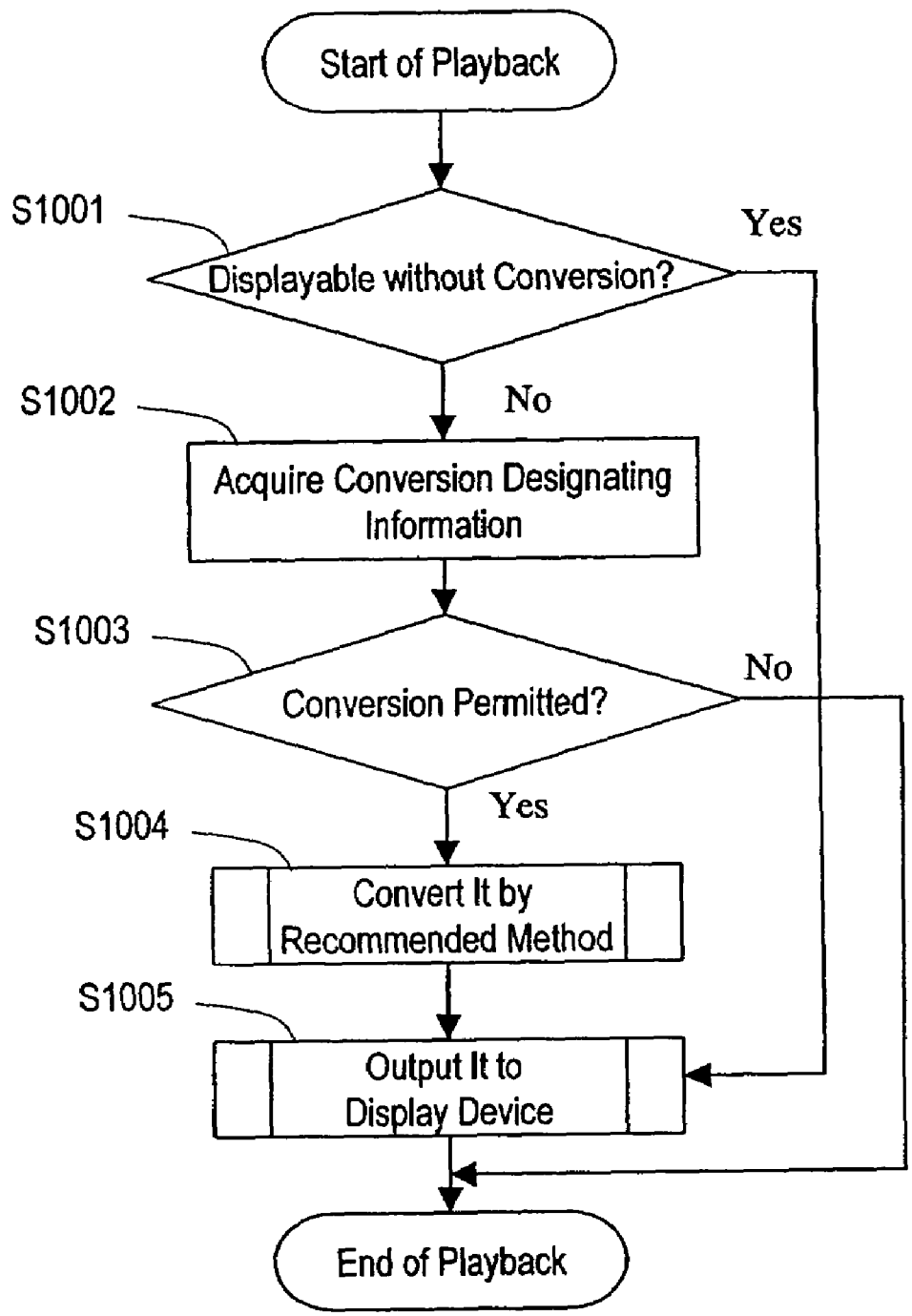
FIG. 37 shows a procedure in which SD video is played back with a down conversion method determined in accordance with the conversion designating information.

FIG. 37 shows a procedure in which SD video is played back with a down conversion method determined in accordance with the conversion designating information. This processing may be carried out by the player 100, for example.

First, on receiving a viewer's command to start the playback operation, the player 100 determines whether or not the display device (e.g., a TV set) connected can display the HD video content to be presented without down-converting it (S002). If the answer is YES, then the player 100 outputs the HD video as it is to the display device (S1005) to get the HD video presented on the display device.

On the other hand, if the HD video needs to be down-converted into SD video, then the player 100 acquires the conversion designating information (S1002) and determines by reference to the flag DC_prohibit_flag whether or not the down conversion is permitted (S1003). If the answer is NO, then the playback of this content is ended.

However, if the down conversion is permitted, then the player 100 identifies a recommended down conversion method by reference to the information DC_PAL that designates the recommended conversion method, and down-converts the HD video by that method (S1004). Then, the player 100 outputs the SD video, obtained by the down conversion, to the display device (S1005). Thereafter, until the playback interval of that content has been played back fully, the player 100 continues performing the down conversion processing and outputting and playing the SD video.

Optionally, while presenting the information about the recommended conversion method on an on-screen display, the player 100 may pick a down conversion method in accordance with the viewer's command.

In the preferred embodiment described above, only HD grade subtitles or still picture data is stored. Alternatively, SD grade subtitles or still picture data may be separately stored for future down conversion such that the player or the user can make a selection at the time of down conversion. Also, although only the HD grade subtitles or still picture data is supposed to be stored, the subtitles to be synthesized during the down conversion may be generated with a vector image font such as True Type in order to guarantee sufficient video quality at the time of the down conversion.

Also, in the preferred embodiment described above, the method of defining the subtitle display area has not been described in detail. Optionally, a number of different subtitle display areas may be separately defined with the possible down conversion taken into account. Examples of those areas include an area for HD subtitles, an area for down-converted NTSC-compliant letterbox subtitles, an area for down-converted NTSC-compliant panned and scanned subtitles, an area for down-converted PAL-compliant letterbox subtitles, and an area for down-converted PAL-compliant panned and scanned subtitles. Alternatively, the display area may be changed according to the user's preference.

In the preferred embodiment described above, while a down conversion is carried out as the field doubling conversion, a particular field is supposed to be presented again as it is. However, to reduce the degree of video blurring during the down conversion, an intermediate field picture may be generated from the previous and next pictures and may be inserted to perform the field doubling conversion. In the example illustrated in FIG. 34, for instance, the second picture P5t to be presented again in 50 Hz-FD (PAL) on the third row may be generated from the two pictures P5 and P6 in 24 Hz (film).

Furthermore, in the preferred embodiment described above, the HD grade video data and subtitle data are supposed to be converted into SD grade video data. However, even when SD grade video is converted into HD grade video and presented on an HDTV, HD grade data, in which the video and subtitle are synthesized together, can be obtained by performing processing similar to that described above. Thus, the present invention can be used to convert video and subtitle data with a certain resolution into synthetic video data with a different resolution from the former resolution.

The present invention has been described as being applied to a model based on a T-STD for an MPEG-TS. However, this is just an example, and the present invention is equally applicable for use to process an MPEG-PS or any other video/audio multiplexed stream.

INDUSTRIAL APPLICABILITY

According to the present invention, in down-converting HD video into SD video and viewing the SD video, a best down conversion method for the given content may be selected either automatically or according to the user's preference. Also, an SD grade subtitle, having the same contents as the counterpart appearing on an HD grade video picture, is associated with an SD grade video picture, thereby generating and outputting synthetic video. As a result, SD video with quite the same contents as HD video can be presented. Furthermore, by defining a synchronous presentation model for a subtitle (i.e., a still picture) and a moving picture, compatibility is guaranteed among various types of equipment.

The invention claimed is:

1. A data processor comprising:
   a receiving section that receives a data stream including data representing first primary video having a first picture rate and data representing first auxiliary video to be presented synchronously with the first primary video; and
   a converting section for converting the data representing the first primary video and the first auxiliary video into data representing synthetic video having a second picture rate, which is different from the first picture rate,
   wherein the data stream includes timing information defining respective times to present the first primary video and the first auxiliary video, and
   wherein, in converting the first primary video data and the first auxiliary video data of a film material into NTSC- or PAL-compliant synthetic video data, the converting section associates second auxiliary video, having the same contents as the first auxiliary video on a picture of the first primary video, with a plurality of pictures of second primary video, corresponding to the picture of the first primary video, thereby generating synthetic video composed of the second primary video and the second auxiliary video.

2. The data processor of claim 1, wherein the converting section includes:
   a video converting section for converting the data representing the first primary video into data representing the second primary video by changing the picture rates;
   a subtitle converting section for converting the data representing the first auxiliary video into data representing the second auxiliary video, identifying a picture of the first primary video to be presented synchronously with letters of the first auxiliary video, and associating letters of the second auxiliary video, corresponding to the letters of the first auxiliary video, with a picture of the second primary video corresponding to the identified picture of the first primary video; and
   a synthesizing section for generating data representing the synthetic video by synthesizing together the second primary video data and the second auxiliary video data that have been associated with each other.

3. The data processor of claim 1, wherein the converting section includes:
   a synthesizing section for generating superposed video, in which the first primary video and the first auxiliary video are synchronized with each other in accordance with the timing information and superposed one upon the other; and
   a video converting section for converting data representing the superposed video into data representing the synthetic video.

4. The data processor of claim 1, wherein the converting section converts the data representing the first primary video and the first auxiliary video and having a predetermined resolution into data representing the synthetic video that has a resolution different from the predetermined resolution.

5. The data processor of claim 1, wherein the converting section converts one frame of the first primary video and the first auxiliary video of the film material into at least two fields of the PAL-compliant synthetic video with the same field inserted at regular intervals a number of times during the conversion into the fields.

6. The data processor of claim 1, wherein the data stream includes conversion permissibility information indicating whether or not the converting section may do conversion, and
   wherein the converting section does the conversion when the conversion permissibility information permits the converting section to do so.

7. The data processor of claim 1, wherein the data stream includes conversion designating information designating the type of conversion to do, and wherein the converting section does the type of conversion that has been designated by the conversion designating information.

8. The data processor of claim 1, further comprising an input section, to which conversion designating information, designating the type of conversion to do, is input,
wherein the converting section does the type of conversion that has been designated by the conversion designating information.

9. The data processor of claim 8, wherein the converting section generates PAL-compliant synthetic video by performing either a conversion of presenting each picture a single time or a conversion of presenting a particular picture a number of times in accordance with the conversion designating information.

10. The data processor of claim 1, wherein the converting section identifies the first primary video and the first auxiliary video on the first primary video based on the respective timing information to present the first primary video and the first auxiliary video.

* * * * *